(12) United States Patent
Jo et al.

(10) Patent No.: US 10,890,708 B2
(45) Date of Patent: Jan. 12, 2021

(54) LIGHT GUIDE PLATE HAVING ENGRAVED PATTERN AND BACKLIGHT UNIT HAVING SAME AND DISPLAY DEVICE HAVING SAME

(71) Applicant: KOYJ CO., LTD., Chungju-si (KR)

(72) Inventors: Jai Hyoung Jo, Yongin-si (KR); Cha Yeon Kim, Yongin-si (KR); Young Gil Kim, Cheonan-si (KR)

(73) Assignee: KOYJ CO., LTD., Chungju-si (KR)

( * ) Notice: Subject to any disclaimer, the term of this patent is extended or adjusted under 35 U.S.C. 154(b) by 0 days.

(21) Appl. No.: 16/256,508

(22) Filed: Jan. 24, 2019

(65) Prior Publication Data

US 2019/0361164 A1    Nov. 28, 2019

(30) Foreign Application Priority Data

May 25, 2018    (KR) .................. 10-2018-0059953
Aug. 22, 2018    (KR) .................. 10-2018-0097985

(51) Int. Cl.
*F21V 8/00*    (2006.01)

(52) U.S. Cl.
CPC ......... *G02B 6/0036* (2013.01); *G02B 6/0051* (2013.01); *G02B 6/0053* (2013.01); *G02B 6/0055* (2013.01); *G02B 6/0061* (2013.01); *G02B 6/0065* (2013.01); *G02B 6/007* (2013.01); *G02B 6/0073* (2013.01)

(58) Field of Classification Search
CPC .. G02B 6/0036; G02B 6/0038; G02B 6/0051; G02B 6/0053; G02B 6/0055; G02B 6/0061; G02B 6/0065; G02B 6/007; G02B 6/0073
See application file for complete search history.

(56) References Cited

U.S. PATENT DOCUMENTS

| 2007/0041216 A1* | 2/2007 | Yue | G02B 6/0061 362/620 |
| 2009/0046220 A1* | 2/2009 | Tsuchiya | G02B 6/0065 349/65 |
| 2013/0182200 A1* | 7/2013 | Ishizumi | G02B 6/0036 349/65 |
| 2015/0235508 A1* | 8/2015 | Shinohara | G02B 6/0036 463/31 |

FOREIGN PATENT DOCUMENTS

| JP | H11-109136 A | 4/1999 |
| JP | 2008-84544 A | 4/2008 |
| JP | 2008-203633 A | 9/2008 |
| JP | 2013-080120 A | 5/2013 |
| KR | 10-2004-0014890 A | 2/2004 |
| KR | 10-2008-0013889 A | 1/2009 |
| KR | 10-2015-0070736 | 6/2015 |

* cited by examiner

*Primary Examiner* — Bao Q Truong
(74) *Attorney, Agent, or Firm* — Westerman, Hattori, Daniels & Adrian, LLP

(57) ABSTRACT

Disclosed are a light guide plate having an engraved pattern and a backlight unit having the same and a display device having the same, wherein the engraved pattern is configured such that a light incident surface thereof has an arc shape on a plane and a vertical section taken along a straight line passing through a center of the light incident surface is triangular. This makes it possible to maximize total reflection efficiency to increase luminous intensity of light output, resulting in improved light use efficiency and enhanced brightness of the backlight unit.

19 Claims, 22 Drawing Sheets

(0,0) POINT

LIGHT GUIDE PLATE HAVING ENGRAVED PATTERN AND BACKLIGHT UNIT HAVING SAME AND DISPLAY DEVICE HAVING SAME

BACKGROUND OF THE INVENTION

Field of the Invention

The present invention relates generally to a light guide plate having an engraved pattern and a backlight unit having the same and a display device having the same. More particularly, the present invention relates to a light guide plate having an engraved pattern capable of increasing light use efficiency and maximizing total reflection efficiency, and to a backlight unit having the same and a display device having the same.

Description of the Related Art

In general, a liquid crystal display device, which is one of planar panel display devices for displaying images using liquid crystal, is thinner and lighter than other display devices and has advantages of low driving voltage and low power consumption and thus is widely used in the industrial field.

Such a liquid crystal display device requires an additional backlight unit for supplying light to a display panel because the display panel for displaying images is a non-light emitting device that cannot emit light by itself.

The backlight unit includes a light source for generating light, a light guide plate for receiving the light from the light source and outputting the light upward, a diffusion sheet for diffusing the light output through the light guide plate to a front surface of a panel, and a prism sheet positioned at an upper side of the diffusion sheet.

The backlight unit allows light generated from a light emitting diode (LED) light source to pass through the light guide plate, the diffusion sheet, and the prism sheet and controls the luminous intensity of light output and the angle of light output such that the light is output to the front surface of the panel.

The backlight unit allows the light generated from the LED light source to sequentially pass through the light guide plate, the diffusion sheet, and the prism sheet, while sequentially increasing the angle of light output of the light source such that a main path is maintained at 90° when light is output.

However, a backlight unit according to the related art is designed such that the main path of light is maintained at 90° when light is finally output, but is problematic in that output light returns due to the total reflection of 2 to 3%, resulting in loss of light and low brightness.

Furthermore, the backlight unit according to the related art has multiple LED light sources arranged in a line to be spaced apart from each other by regular intervals at a side of the light guide plate. Because of this, at a light incident surface of the light guide plate where the LED light sources are positioned and light is incident, light generated from the LED light sources appears to extend in spaced-apart lines (hereinafter, referred to as "light lines")

Furthermore, the backlight unit according to the related art has an embossed pattern on a bottom surface thereof, resulting in low light use efficiency and low total reflection efficiency.

FIG. 1 is a photograph showing light lines that appear on the backlight unit according to the related art. Referring to FIG. 1, light generated from the LED light sources appears to extend in lines at a part of the light incident surface of the light guide plate at which the LED light sources are positioned.

This is a phenomenon occurring due to the intervals of the LED light sources arranged to be spaced apart on the light incident surface of the light guide plate.

It is to be noted that the related art regarding the present invention is Korean Patent Application Publication No. 10-2004-0014890, entitled "Brightness enhanced printless type light guide panel with extruded pattern in LCD backlight device" (published on Feb. 18, 2004).

Korean Patent Application Publication No. 10-2004-0014890, entitled "Brightness enhanced printless type light guide panel with extruded pattern in LCD backlight device" (published on Feb. 18, 2004) is characterized in that cone-shaped protrusions having a predetermined arrangement are formed on a light guide panel in horizontal and vertical directions, wherein each protrusion is controlled in height or protrusions having a predetermined size are controlled in density, thus making the brightness on the surface of the light guide plate uniform.

However, Korean Patent Application Publication No. 10-2004-0014890, entitled "Brightness enhanced printless type light guide panel with extruded pattern in LCD backlight device" is problematic in that the cone-shaped embossed protrusions cause low light use efficiency and low total reflection efficiency.

Furthermore, Korean Patent Application Publication No. 10-2004-0014890, entitled "Brightness enhanced printless type light guide panel with extruded pattern in LCD backlight device" is problematic in that the simple cone-shaped embossed protrusions have a limitation in preventing total reflection of light and preventing light lines occurring at the light incident surface of the light guide plate.

The foregoing is intended merely to aid in the understanding of the background of the present invention, and is not intended to mean that the present invention falls within the purview of the related art that is already known to those skilled in the art.

DOCUMENTS OF RELATED ART (Patent document 1) Korean Patent Application Publication No. 10-2004-0014890, entitled "Brightness enhanced printless type light guide panel with extruded pattern in LCD backlight device" (published on Feb. 18, 2004)

SUMMARY OF THE INVENTION

Accordingly, the present invention has been made keeping in mind the above problems occurring in the related art, and an objective of the present invention is to provide a light guide plate having an engraved pattern and a backlight unit having the same and a display device having the same, wherein the engraved pattern is provided in a lower surface of the light guide plate to maximize total reflection efficiency, leading to an increase in luminous intensity of light output.

Another objective of the present invention is to provide a light guide plate having an engraved pattern and a backlight unit having the same and a display device having the same, wherein the engraved pattern is provided in a partially-cut conical shape to uniformly scatter light, making it possible to reduce light lines occurring due to intervals of LED light sources spaced apart from each other and to enhance brightness of light.

In order to achieve the above objectives, according to one aspect of the present invention, there is provided a light guide plate having an engraved pattern, the light guide plate including: a light guide plate member allowing light of a light source incident upon a first side surface thereof to be output to an upper surface thereof, and having multiple engraved patterns formed in a lower surface thereof and arranged to be spaced apart from each other, wherein each of the engraved patterns is configured such that an arc-shaped light incident surface thereof that is oriented toward the light source has a predetermined curvature on a plane and a vertical section thereof taken along a straight line passing through a center of the light incident surface is triangular.

The light guide plate member may be made of any one material selected from polymethyl methacrylate (PMMA), polycarbonate (PC), methyl methacrylate-co-styrene (MS), silicone, polystyrene (PS), and glass that change a path of light from a line or point light source made up of a light source of a cold cathode fluorescent lamp (CCFL) or a light emitting diode (LED) to a planar light source.

The light incident surface may be formed as a slantly curved surface.

A pattern lower surface of the engraved pattern, that is, a lower surface of the engraved pattern may be aligned with a lower surface of the light guide plate, and a light incident surface angle with respect to the pattern lower surface of the engraved pattern may be 25° to 85°.

An apex angle of the engraved pattern may be 70° to 125°. The light incident surface may have an arc-shaped upper curved line positioned at an upper end thereof and having a predetermined curvature on a plane and an arc-shaped lower curved line positioned at a lower end thereof and having a predetermined curvature on a plane, the curvature of the lower curved line being smaller than that of the upper curved line, and the lower curved line may have a radius of curvature of 30 μm to 150 μm.

The engraved pattern may have a depth of 4 μm to 12 μm.

The light incident surface may be formed as a slantly curved surface; a pattern lower surface of the engraved pattern, that is, a lower surface of the engraved pattern may be aligned with a lower surface of the light guide plate, and a light incident surface angle with respect to the pattern lower surface of the engraved pattern is 25° to 85°; an apex angle of the engraved pattern may be 70° to 125°; the light incident surface may have an arc-shaped upper curved line positioned at an upper end thereof and having a predetermined curvature on a plane and an arc-shaped lower curved line positioned at a lower end thereof and having a predetermined curvature on a plane, the curvature of the lower curved line being smaller than that of the upper curved line; the lower curved line may have a radius of curvature of 30 μm to 150 μm; and the engraved pattern may have a depth of 4 μm to 12 μm.

The engraved pattern may be a conical pattern formed by partially cutting a basic cone to have a slant surface at a side thereof.

The conical pattern may be formed by slantly cutting the basic cone such that a portion of the basic cone that is to be cut out includes an apex and a portion of a base of the basic cone, and the conical pattern may be configured such that a curved surface thereof is positioned toward a light incident surface of the light guide plate member and the slant surface thereof is positioned in a direction opposite to the light incident surface of the light guide plate member.

The conical pattern may be positioned such that a density thereof gradually increases from a light incident surface of the light guide plate member at which the light source is positioned to a second side surface of the light guide plate member.

The slant surface of the conical pattern may be parallel to a side of the basic cone.

The basic cone may have a conical shape in which the apex is sharp, the base is circular, a side is curved, an internal apex angle is 95° to 125°, and a diameter of the base is 40 μm to 130 μm.

A height difference between the conical pattern and the basic cone may be 7 μm to 23 μm, and the engraved pattern has a depth of 4 μm to 12 μm.

An apex portion of the conical pattern may have an arc having a radius of curvature of 45 μm to 85 μm.

An internal apex angle of the conical pattern may be 70° to 115°.

A light incident surface angle of the conical pattern is 25° to 60°.

The conical pattern may be configured such that a radius of curvature of a curved line of the base is 40 μm to 130 μm.

According to another aspect of the present invention, there is provided a backlight unit, including: a light source emitting light; a light guide plate member having a side surface at which the light source is positioned and allowing the light of the light source incident upon the side surface to be output to an upper surface thereof; a diffusion sheet positioned on the light guide plate member and diffusing light; and a prism sheet positioned on the diffusion sheet and configured to refract and condense light, wherein the light guide plate member has multiple engraved patterns formed in a lower surface thereof and arranged to be spaced apart from each other, and each of the engraved patterns is configured such that an arc-shaped light incident surface thereof that is oriented toward the light source has a predetermined curvature on a plane and a vertical section thereof taken along a straight line passing through a center of the light incident surface is triangular.

According to yet another aspect of the present invention, there is provided a display device, including: a light guide plate member having a side surface at which a light source is positioned and allowing light of the light source introduced from the side surface to be output to an upper surface thereof, wherein the light guide plate member has multiple engraved patterns formed in a lower surface thereof and arranged to be spaced apart from each other, and each of the engraved patterns is configured such that an arc-shaped light incident surface thereof that is oriented toward the light source has a predetermined curvature on a plane and a vertical section thereof taken along a straight line passing through a center of the light incident surface is triangular.

According to the present invention, the engraved pattern formed in the lower surface of the light guide plate member is configured such that the light incident surface thereof has an arc shape on the plane and the vertical section taken along the straight line passing through the center of the light incident surface is triangular. This makes it possible to maximize total reflection efficiency to increase luminous intensity of light output, resulting in improved light use efficiency and enhanced brightness of the backlight unit.

Furthermore, according to the present invention, the engraved pattern having the partially-cut conical shape can uniformly scatter light, making it possible to increase brightness of light and thus to increase light efficiency.

According to the present invention, the engraved pattern having the partially-cut conical shape can uniformly scatter light, making it possible to reduce light lines occurring due to intervals of the LED light sources spaced apart from each other.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

The present invention will be described in more detail.

Hereinbelow, exemplary embodiments of the present invention will be described in detail with reference to the accompanying drawings. The terms and words used in the present specification and claims should not be interpreted as being limited to typical meanings or dictionary definitions. Specific structural and functional descriptions of embodiments of the present invention disclosed herein are only for illustrative purposes of the preferred embodiments of the present invention, and the present description is not intended to represent all of the technical spirit of the present invention. On the contrary, the present invention is intended to cover not only the exemplary embodiments, but also various alternatives, modifications, equivalents and other embodiments that may be included within the spirit and scope of the present invention as defined by the appended claims.

Figure 2:
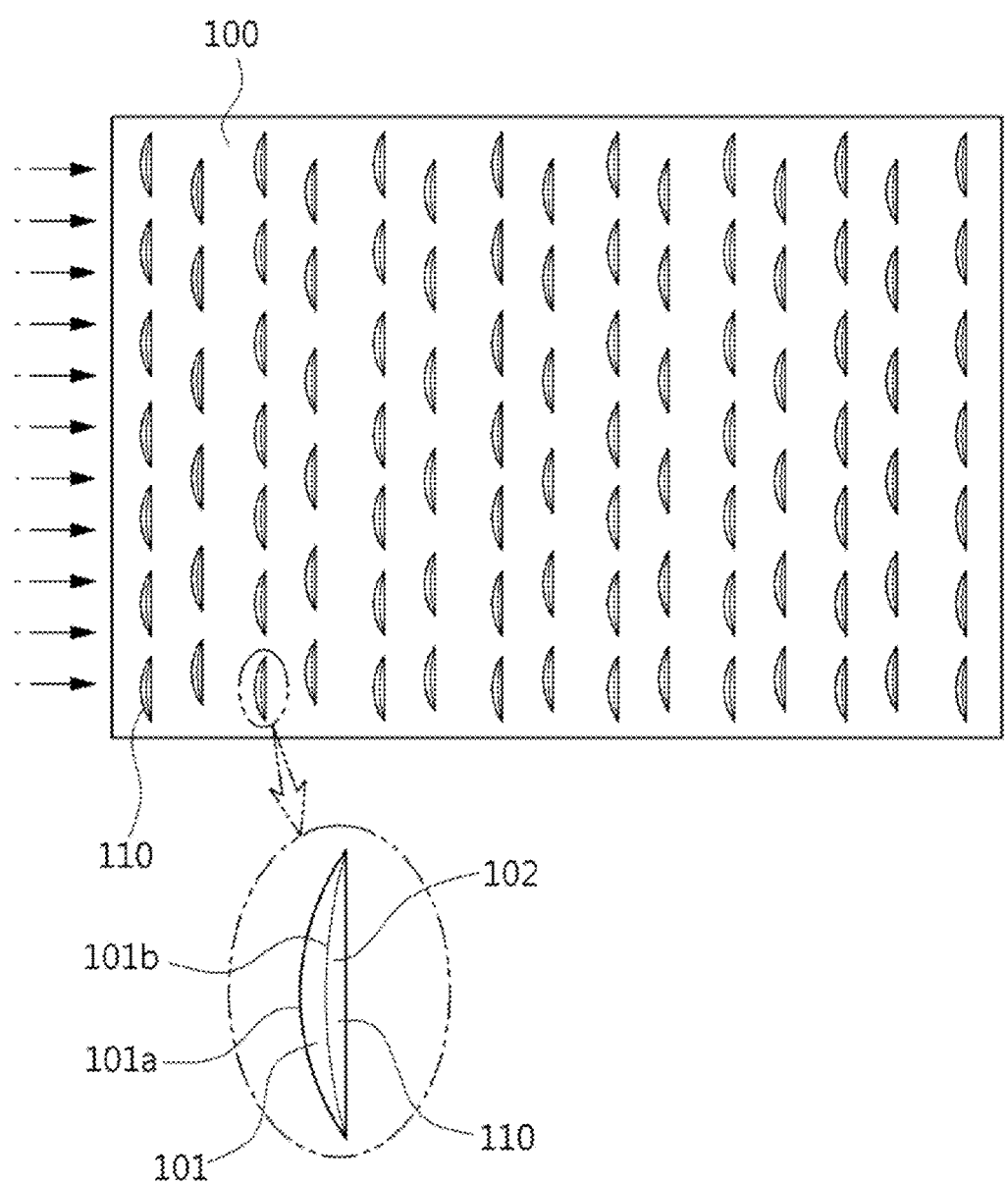
FIG. 2 is a bottom view showing a first embodiment of a light guide plate having an engraved pattern according to the present invention.
Figure 3:
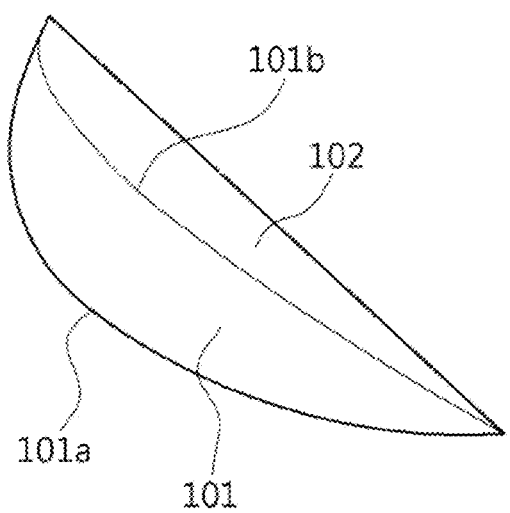
FIG. 3 is a perspective view showing the engraved pattern in the first embodiment of the light guide plate having the engraved pattern.

FIG. 2 is a bottom view showing a first embodiment of a light guide plate having an engraved pattern according to the present invention, FIG. 3 is a perspective view showing the engraved pattern in the first embodiment of the light guide plate having the engraved pattern, and FIGS. 4A to D are views showing a shape of the engraved pattern in the first embodiment of the light guide plate having the engraved pattern.

Figure 4A:
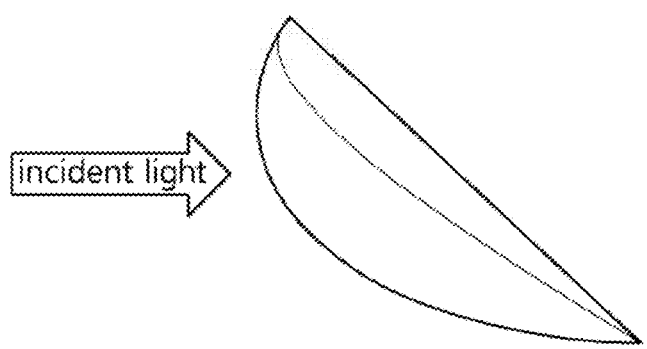
FIGS. 4A to 4D are views showing a shape of the engraved pattern in the first embodiment of the light guide plate having the engraved pattern.
Figure 4B:
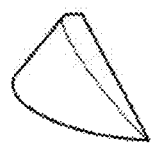
Figure 4D:
Figure 4C:
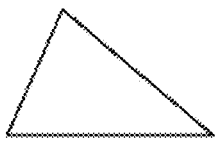

FIGS. 4A and 4B are views schematically showing the engraved pattern according to the present invention in three-D (3D), FIG. 4C is a side view schematically showing the engraved pattern, and FIG. 4D is a plan view schematically showing the engraved pattern.

Figure 5:
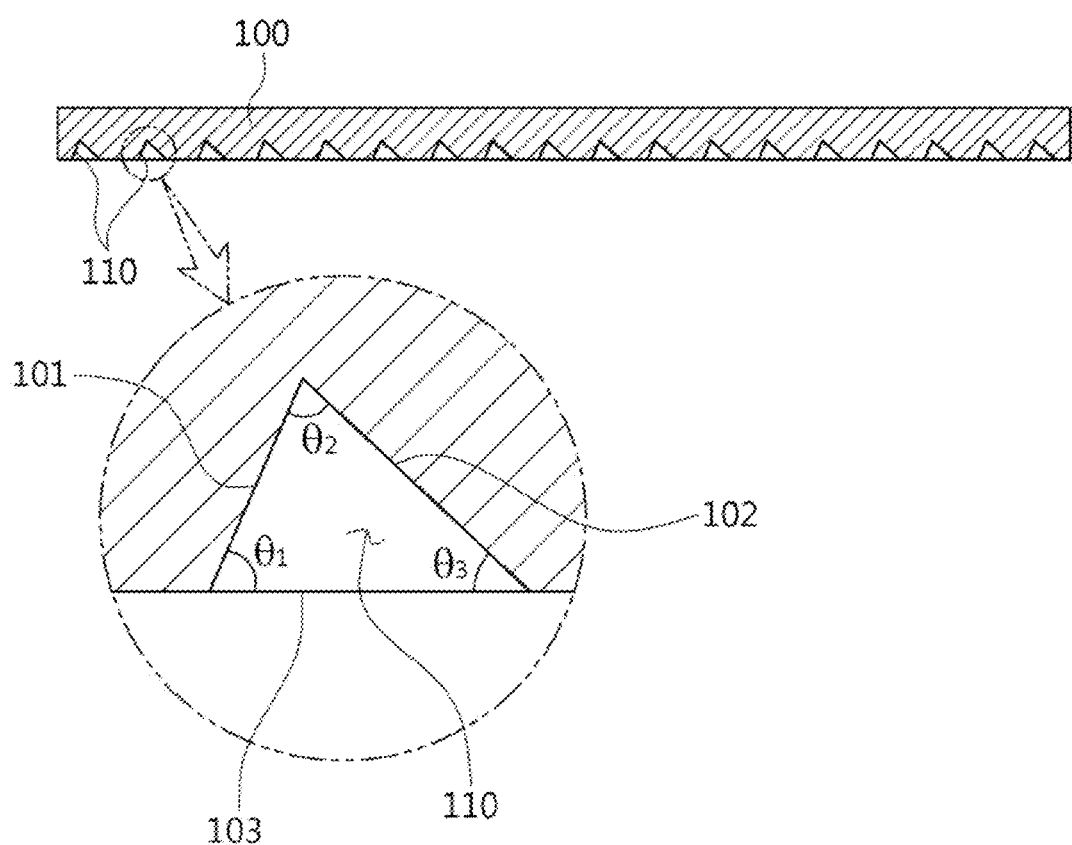
FIG. 5 is a sectional view showing the first embodiment of the light guide plate having the engraved pattern.
Figure 6:
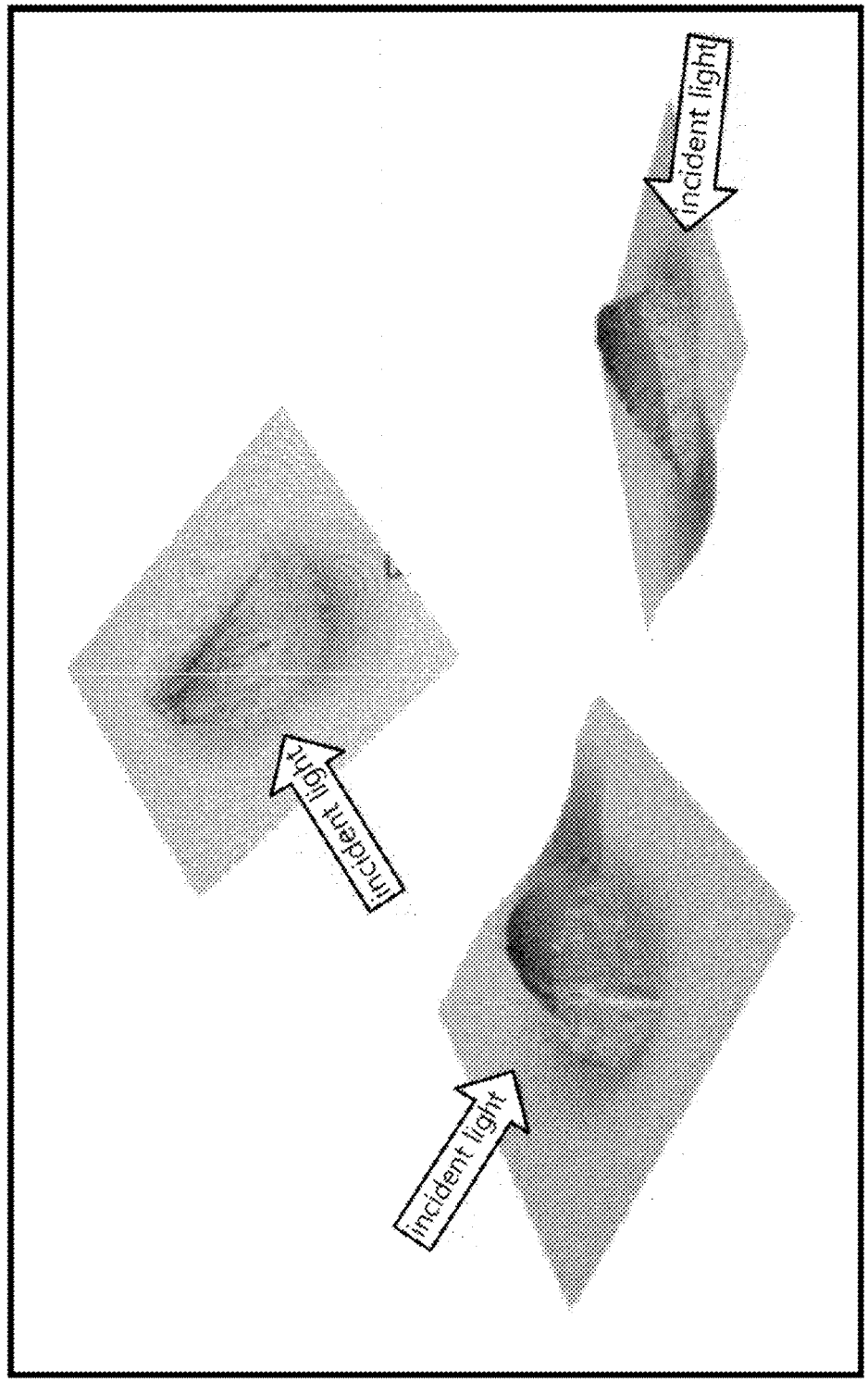
FIG. 6 is a view showing the shape of the engraved pattern viewed from an inside of the light guide plate in the embodiment of the light guide plate having the engraved pattern according to the present invention.
Figure 7:
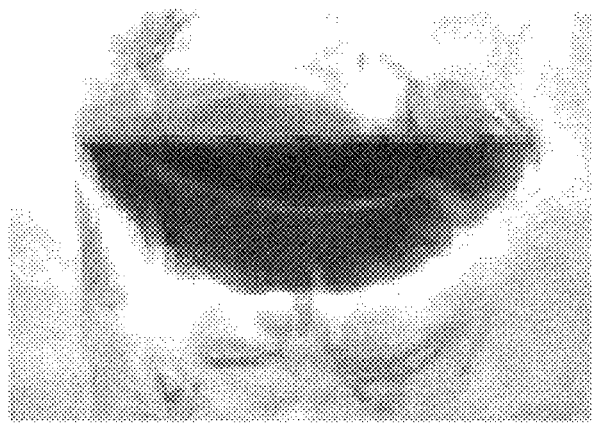
FIG. 7 is an image of the engraved pattern viewed from a bottom of the light guide plate in the embodiment of the light guide plate having the engraved pattern according to the present invention.

FIG. 5 is a sectional view showing the first embodiment of the light guide plate having the engraved pattern, FIG. 6 is a view showing the shape of the engraved pattern viewed from an inside of the light guide plate in the embodiment of the light guide plate having the engraved pattern according to the present invention; and FIG. 7 is an image of the engraved pattern viewed from a bottom of the light guide plate in the embodiment of the light guide plate having the engraved pattern according to the present invention.

An embodiment of a light guide plate having an engraved pattern according to the present invention will be described in detail below with reference to FIGS. 2 to 7.

In FIGS. 3 and 4, the shape of the engraved pattern is schematically shown in 3D such that the shape of the engraved pattern formed in a lower surface of a light guide plate member 100 in a groove shape is ascertained more easily.

The light guide plate having the engraved pattern according to the present invention includes the light guide plate member 100 allowing light of a light source incident upon a first side surface thereof to be output to an upper surface thereof, and having multiple engraved patterns 110 formed in the lower surface thereof and arranged to be spaced apart from each other.

It is to be noted that a second embodiment of the light guide plate having the engraved pattern according to the present invention is a light guide plate member for allowing light of a light source incident upon a side surface thereof to be output to an upper surface thereof.

It is to be noted that the light guide plate member 100 is an optical component made of a transparent synthetic resin such as polymethyl methacrylate (PMMA), polycarbonate (PC), methyl methacrylate-co-styrene (MS), silicone, polystyrene (PS), and the like which changes the path of light from a line or point light source made up of a light source of a cold cathode fluorescent lamp (CCFL) or a light emitting diode (LED) to a planar light source.

The light guide plate member 100 may be made of any one material selected from polymethyl methacrylate (PMMA), polycarbonate (PC), methyl methacrylate-co-styrene (MS), silicone, polystyrene (PS), and glass.

As an example, the first side surface of the light guide plate member 100 is a light incident surface upon which light from the light source is incident, and the upper surface of the light guide plate member 100 positioned in a direction perpendicular to the light incident surface is a light output surface through which light is output.

Each of the engraved pattern 110 is configured such that an arc-shaped light incident surface 101 thereof that is oriented toward the light source, which is the light incident surface 101 facing the light source, has a predetermined curvature on a plane.

The light incident surface 101 is formed as a slantly curved surface in a vertical direction.

Furthermore, the engraved pattern 110 has a triangular vertical section taken along the straight line passing through the center of the light incident surface 101.

The engraved pattern 110 only varies the path of light depending on the pattern shape, thus minimizing brightness loss and has various light receiving angles in x-, y-, and z-axis directions, thus maximizing refraction of light.

The engraved pattern 110 is configured such that the arc-shaped light incident surface 101 thereof that is oriented toward the light source has the predetermined curvature on the plane and the vertical section thereof taken along the straight line passing through the center of the light incident surface 101 is triangular. Additionally, a light incident surface angle $\Theta_1$ with respect to the surface of the light guide plate member 100 aligned with the lower side of the triangular vertical section, an apex angle $\Theta_2$, and the curvature of the light incident surface 101 on the plane are defined, whereby only the path of light is varied, thus exhibiting minimized brightness loss and the light receiving angle varies in the x-, y-, and z-axis directions, thus exhibiting maximized refraction of light.

A rear surface angle $\Theta_3$, which faces the light incident surface angle $\Theta_1$ with respect to the surface of the light guide plate member 100 aligned with the lower side of the triangular vertical section, is a value obtained by subtracting the sum of the light incident surface angle $\Theta_1$ and the apex angle $\Theta_2$ from 180 degree angles that are the sum of the internal angles of a triangle.

The light incident surface 101 has an arc-shaped upper curved line 101b positioned at an upper end thereof and having a predetermined curvature on a plane and an arc-shaped lower curved line 101a positioned at a lower end thereof and having a predetermined curvature on a plane, the curvature of the lower curved line being smaller than that of the upper curved line 101b.

The engraved pattern 110 has the triangular vertical section taken along the straight line passing through the center of the light incident surface 101 and coinciding with an incident direction of light of the light source, and thus the light incident surface 101 forms a straight slant surface of the vertical section.

Furthermore, the engraved pattern 110 has a groove shape that is open downward on the lower surface of the light guide plate member 100, and this is three-dimensionally shown in a perspective view of FIG. 5 that shows the engraved pattern 110.

Furthermore, the engraved pattern 110 has the open lower surface, the slantly curved light incident surface, and a planar slant surface connected thereto, thus forming a semicircular shape when viewed from the bottom, and the vertical section taken along the straight line passing through the center of the light incident surface of the engraved pattern is triangular.

As an example, the lower surface of the engraved pattern 110, that is, the lower side of the triangular vertical section is aligned with the lower surface of the light guide plate, and the light incident surface angle $\Theta_1$ with respect to a pattern lower surface of the engraved pattern 110, that is, the lower surface of the light guide plate member 100 is 25° to 85°. As an example, the apex angle $\Theta_2$ of the engraved pattern 110 is 70° to 125°, and the lower curved line 101a positioned at the lower end of the light incident surface 101 on the plane has a radius of curvature of 30 μm to 150 μm.

As an example, the engraved pattern 110 is configured such that the light incident surface angle $\Theta_1$ is 25° to 85°, the apex angle $\Theta_2$ is 70° to 125°, and the light incident surface angle $\Theta_1$ is larger than an angle between the lower side of the engraved pattern 110 and the pattern slant surface 102, the angle being opposite to the light incident surface angle.

Furthermore, the engraved pattern 110 has a depth, that is, a height of 4 μm to 12 μm.

As an example, the apex angle $\Theta_2$ of the engraved pattern 110 is an angle between the light incident surface 101 and the pattern slant surface 102.

The pattern slant surface 102 is a slant surface inclined to meet the light incident surface 101 at the apex, thus forming a triangle.

Figure 8:
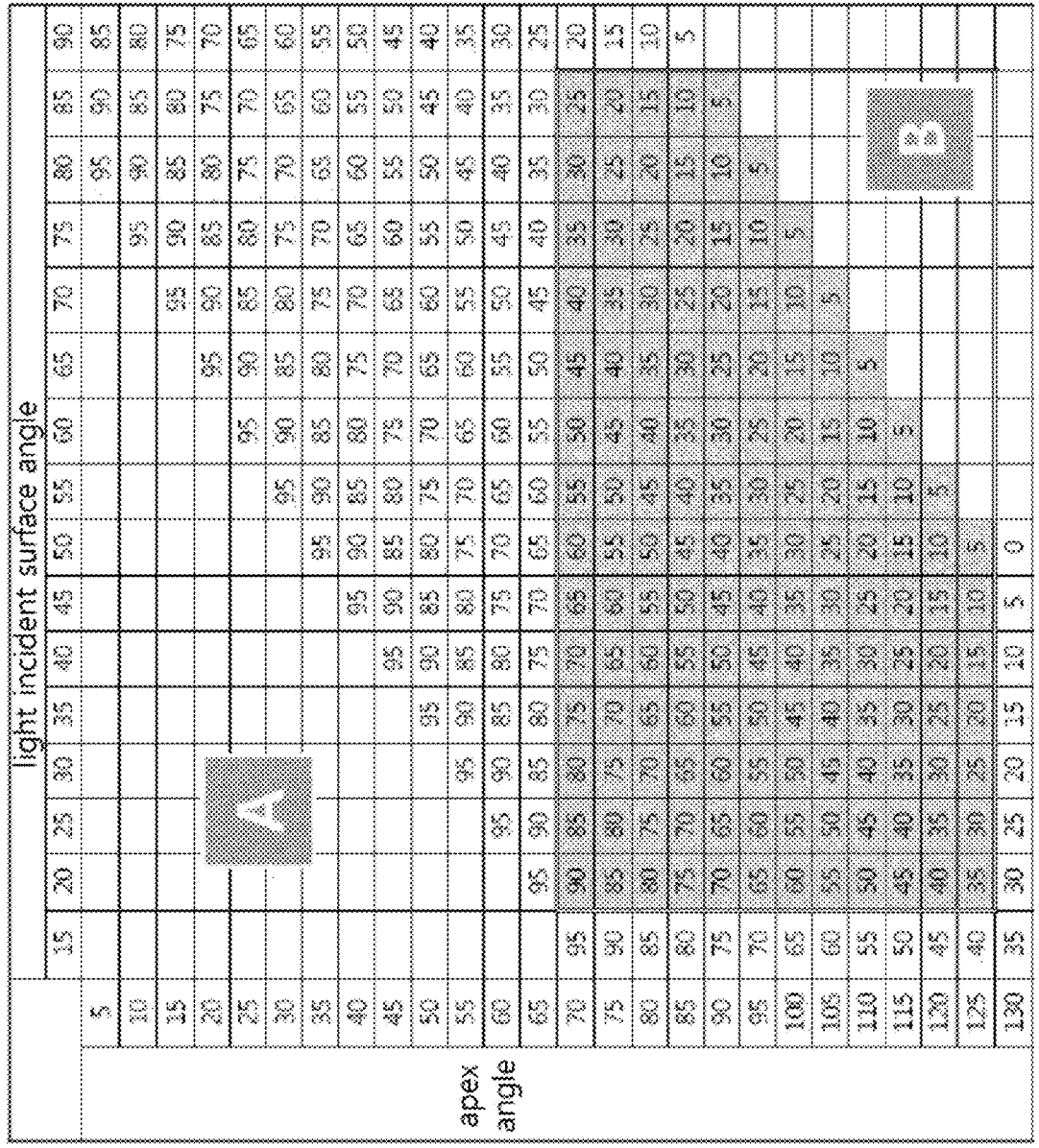
FIG. 8 is an angle table for a rear surface angle facing a light incident surface angle according to an apex angle and a light incident surface angle in the first embodiment of the light guide plate having the engraved pattern according to the present invention.

FIG. 8 is an angle table for the rear surface angle $\Theta_3$ facing the light incident surface angle $\Theta_1$ according to the apex angle $\Theta_2$ and the light incident surface angle $\Theta_8$ in the first embodiment of the light guide plate having the engraved pattern according to the present invention.

Referring to FIG. 8, a region A is a rear surface angle $\Theta_3$ region in which no pattern is formed according to a manufacturing method of the engraved pattern, and a region B is a rear surface angle $\Theta_3$ region in which no triangle is formed because the sum of the internal angles of the triangle is 180°.

Table 1 below shows the luminous intensity of light output on the light guide plate at a horizontal effective angle (25° to 45°) at a light incident surface angle $\Theta_1$ of 15° to 90° when the apex angle $\Theta_2$ of the engraved pattern 110 is 65° to 130° in the light guide plate having the engraved pattern according to the present invention.

Figure 9:
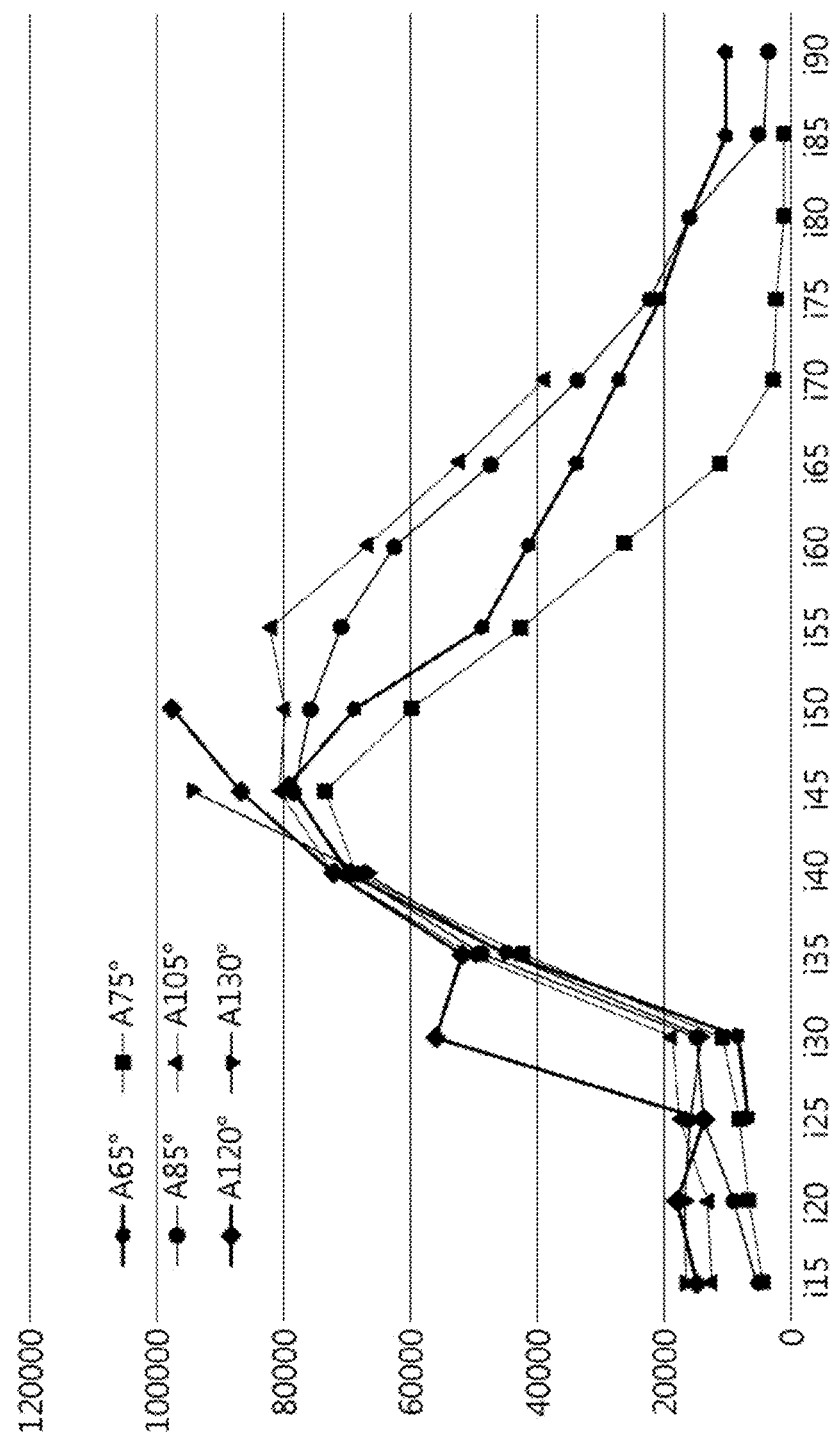
FIG. 9 is a graph of Table 1.

FIG. 9 is a graph showing the luminous intensity (cd) output at the horizontal effective angle (25° to 45°) of the light guide plate member 100 according to the light incident surface angle $\Theta_1$ at an apex angle $\Theta_2$ of 65° to 130° of the engraved pattern 110.

TABLE 1

|  |  | Apex angle ($\theta_2$) | | | | | |
|---|---|---|---|---|---|---|---|
|  |  | 65° | 75° | 85° | 105° | 120° | 130° |
| Light incident surface angle ($\theta_1$) | 15° | — | 4,007 | 4,445 | 11,940 | 14,376 | 16,189 |
|  | 20° | — | 6,141 | 8,381 | 12,484 | 17,403 | 16,283 |
|  | 25° | 6,421 | 7,359 | 13,261 | 16,737 | 13,135 | 15,432 |
|  | 30° | 8,140 | 10,146 | 14,551 | 18,265 | 55,509 | 13,793 |
|  | 35° | 44,768 | 41,874 | 48,733 | 50,336 | 51,670 | 44,238 |
|  | 40° | 77,560 | 68,488 | 69,937 | 71,594 | 71,807 | 66,320 |

TABLE 1-continued

|  | Apex angle ($\theta_2$) | | | | | |
|---|---|---|---|---|---|---|
|  | 65° | 75° | 85° | 105° | 120° | 130° |
| 45° | 80,564 | 73,171 | 78,379 | 80,468 | 86,943 | 94,141 |
| 50° | 68,590 | 59,544 | 75,777 | 79,490 | 97,487 | — |
| 55° | 48,637 | 47,775 | 70,895 | 81,850 | — | — |
| 60° | 41,121 | 26,016 | 67,563 | 66,473 | — | — |
| 65° | 33,541 | 10,610 | 46,994 | 51,958 | — | — |
| 70° | 26,703 | 7,531 | 33,255 | 38,732 | — | — |
| 75° | 20,439 | 1,895 | 21,661 | — | — | — |
| 80° | 15,269 | 453 | 15,516 | — | — | — |
| 85° | 9,741 | 247 | 4,650 | — | — | — |
| 90° | 9,328 | — | 2,876 | — | — | — |

Furthermore, Table 2 below shows the luminous intensity of light output on the light guide plate at the horizontal effective angle (25° to 45°) and a vertical effective angle (65° to 85°) at a light incident surface angle $\Theta_1$ of 15° to 90° when the apex angle $\Theta_2$ of the engraved pattern 110 is 65° to 130° in the light guide plate having the engraved pattern according to the present invention.

Figure 10:
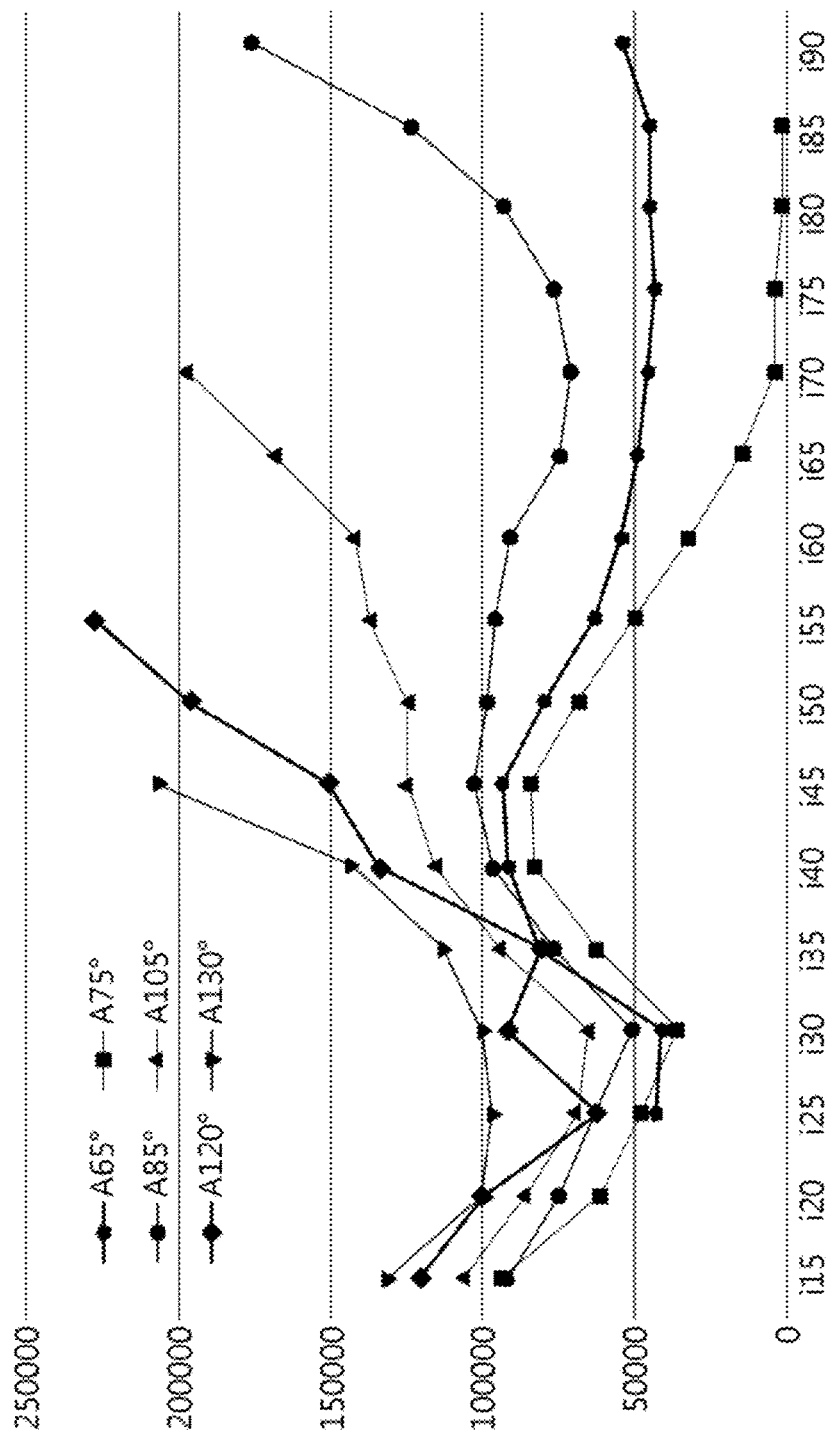
FIG. 10 is a graph of Table 2.

FIG. 10 is a graph showing the luminous intensity (cd) of light output at the horizontal effective angle (25° to 45°) and the vertical effective angle (65° to 85°) according to the light incident surface angle $\Theta_1$ at an apex angle $\Theta_2$ of 65° to 130° of the engraved pattern 110.

In other words, FIG. 10 is a graph of Table 2.

TABLE 2

|  |  | Apex angle ($\theta_2$) | | | | | |
|---|---|---|---|---|---|---|---|
|  |  | 65° | 7.5° | 85° | 105° | 120° | 130° |
| Light incident surface angle ($\theta_1$) | 15° | — | 93,205 | 91,774 | 105,758 | 120,518 | 131,053 |
|  | 20° | — | 60,895 | 75,009 | 86,091 | 99,745 | 99,027 |
|  | 25° | 42,919 | 47,575 | 62,409 | 69,118 | 62,283 | 96,193 |
|  | 30° | 40,667 | 36,130 | 50,632 | 65,125 | 91,590 | 99,517 |
|  | 35° | 80,765 | 62,456 | 76,345 | 93,876 | 79,782 | 112,724 |
|  | 40° | 91,581 | 82,703 | 96,152 | 115,244 | 133,837 | 143,141 |
|  | 45° | 93,198 | 83,899 | 102,745 | 124,474 | 150,458 | 205,978 |
|  | 50° | 79,864 | 68,099 | 98,535 | 124,045 | 196,087 | — |
|  | 55° | 63,187 | 49,691 | 95,386 | 136,672 | 227,549 | — |
|  | 60° | 54,568 | 32,088 | 90,906 | 142,407 | — | — |
|  | 65° | 49,492 | 14,522 | 74,623 | 168,272 | — | — |
|  | 70° | 45,654 | 3,672 | 71,088 | 197,431 | — | — |
|  | 75° | 43,117 | 3,430 | 76,502 | — | — | — |
|  | 80° | 44,926 | 1,443 | 92,577 | — | — | — |
|  | 85° | 45,115 | 689 | 123,217 | — | — | — |
|  | 90° | 53,758 | — | 175,969 | — | — | — |

As can be seen in Table 1, FIG. 9, Table 2, and FIG. 10, when the apex angle $\Theta_2$ of the engraved pattern 110 is 65° to 130°, the effective range of the light incident surface angle $\Theta_1$ is 25° to 85°, preferably 30° to 80°.

As the apex angle $\Theta_2$ of the engraved pattern 110 is large and the light incident surface angle $\Theta_1$ is low, the effective luminous intensity is large. However, if the shape of the engraved pattern 110 is large, the engraved pattern 110 may be visible on the backlight display.

Meanwhile, Table 3 below shows the luminous intensity of light output on the light guide plate at the horizontal effective angle (25° to 45°) at an apex angle $\Theta_2$ of 15° to 130° when the light incident surface angle $\Theta_1$ of the engraved pattern 110 is 15° to 90° in the light guide plate having the engraved pattern according to the present invention.

Figure 11:
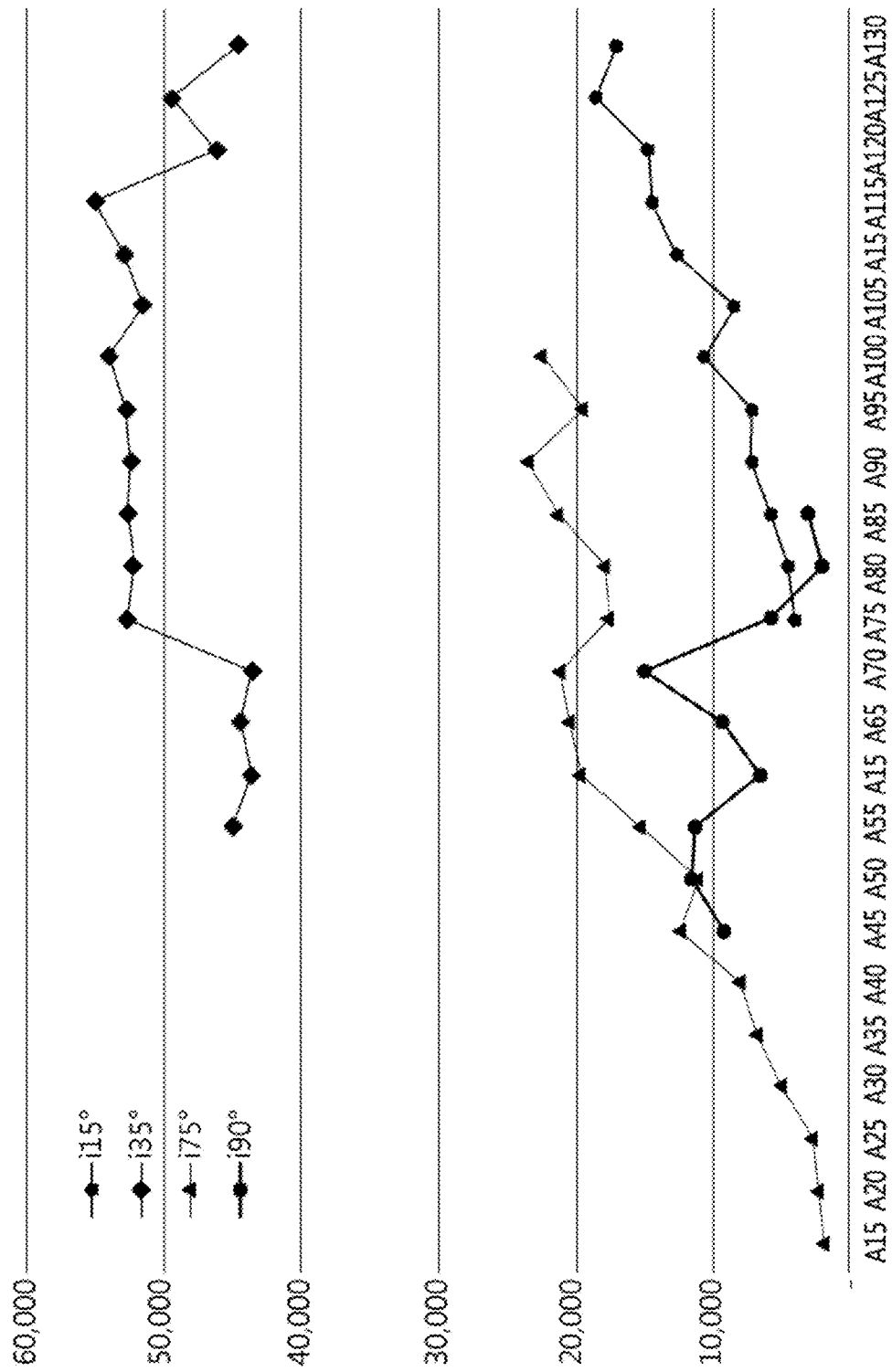
FIG. 11 is a graph of Table 3.

FIG. 11 is a graph showing the luminous intensity (cd) of light output at the horizontal effective angle (25° to 45°) of the light guide plate member 100 according to the apex angle $\Theta_2$ of 15° to 130° at a light incident surface angle $\Theta_1$ of 15° to 90° of the engraved pattern 110.

In other words, FIG. 11 is a graph of Table 3.

TABLE 3

|  |  | Light incident surface angle ($\theta_1$) | | | |
|---|---|---|---|---|---|
|  |  | 15° | 35° | 75° | 90° |
| Apex angle ($\theta_2$) | 15° | — | — | 1,873 | — |
|  | 20° | — | — | 2,324 | — |
|  | 25° | — | — | 2,755 | — |
|  | 30° | — | — | 4,971 | — |
|  | 35° | — | — | 6,743 | — |
|  | 40° | — | — | 7,894 | — |
|  | 45° | — | — | 12,305 | 9,281 |
|  | 50° | — | — | 11,042 | 11,512 |
|  | 55° | — | 44,987 | 15,288 | 11,236 |
|  | 60° | — | 43,580 | 19,660 | 6,576 |
|  | 65° | — | 44,268 | 20,439 | 9,328 |
|  | 70° | — | 43,610 | 21,030 | 14,902 |
|  | 75° | 4,002 | 52,463 | 17,633 | 5,713 |
|  | 80° | 4,452 | 52,098 | 17,805 | 2,180 |
|  | 85° | 5,718 | 52,391 | 21,165 | 3,039 |
|  | 90° | 7,120 | 52,327 | 23,460 | — |
|  | 95° | 7,176 | 52,596 | 19,462 | — |
|  | 100° | 10,513 | 53,750 | 22,353 | — |
|  | 105° | 8,441 | 51,481 | — | — |
|  | 110° | 12,636 | 52,845 | — | — |
|  | 115° | 14,314 | 54,906 | — | — |
|  | 120° | 14,688 | 46,121 | — | — |
|  | 125° | 18,462 | 49,287 | — | — |
|  | 130° | 16,977 | 44,440 | — | — |

Meanwhile, Table 4 below shows the luminous intensity of light output on the light guide plate at the horizontal effective angle (25° to 45°) and the vertical effective angle (65° to 85°) at the apex angle $\Theta_2$ of 15° to 130° when the light incident surface angle $\Theta_1$ of the engraved pattern 110 is 15° to 90° in the light guide plate having the engraved pattern according to the present invention.

Figure 12:
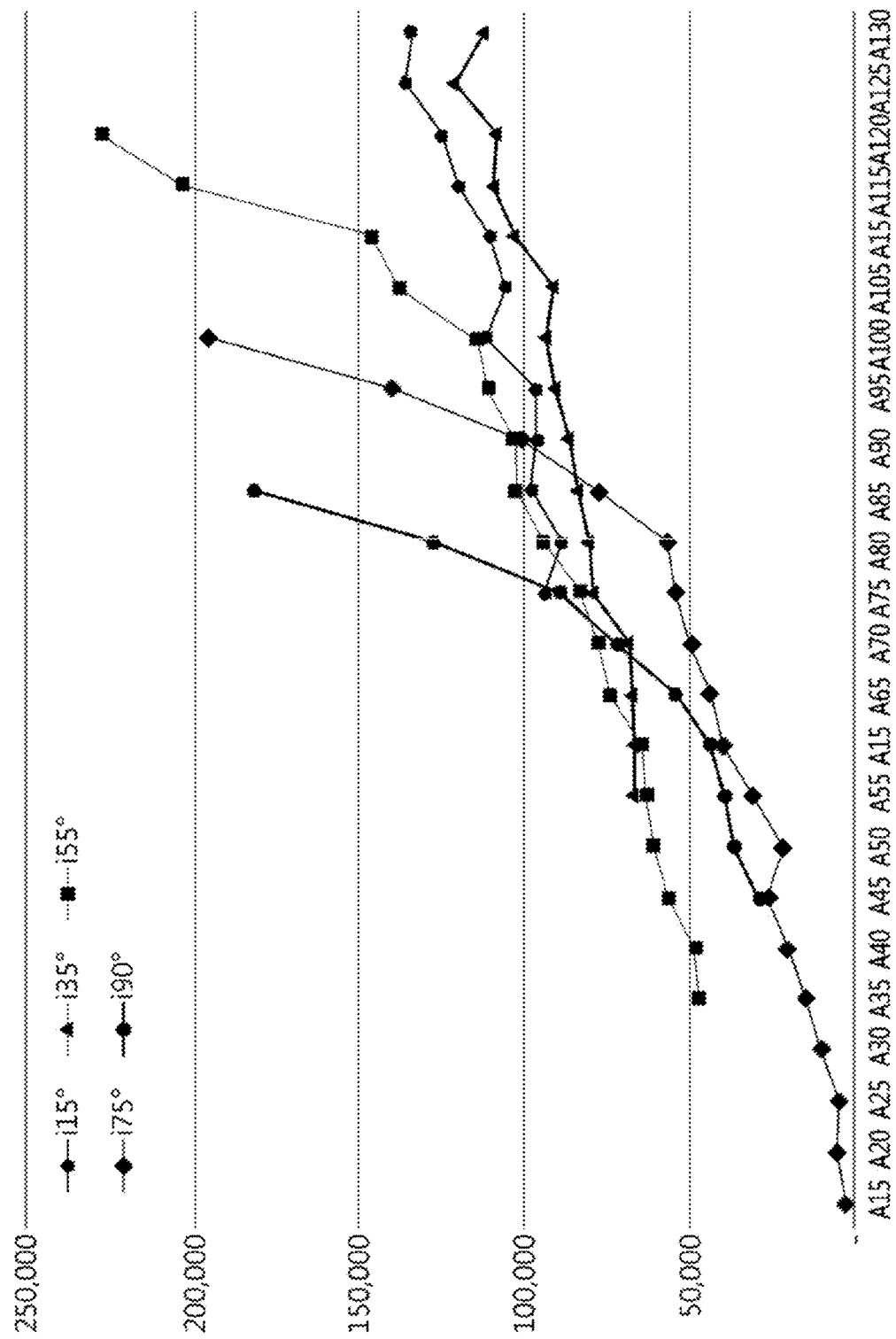
FIG. 12 is a graph of Table 4.

FIG. 12 is a graph showing the luminous intensity (cd) of light output at the horizontal effective angle (25° to 45°) and the vertical effective angle (65° to 85°) of the light guide plate member 100 according to the apex angle $\Theta_2$ of 15° to 130° at the light incident surface angle $\Theta_1$ of 15° to 90° of the engraved pattern 110.

In other words, FIG. 12 is a graph of Table 4.

TABLE 4

|  |  | Light incident surface angle ($\theta_1$) | | | | |
|---|---|---|---|---|---|---|
|  |  | 15° | 35° | 55° | 75° | 90° |
| Apex angle ($\theta_2$) | 15° | — | — | — | 2,666 | — |
|  | 20° | — | — | — | 5,376 | — |
|  | 25° | — | — | — | 4,739 | — |
|  | 30° | — | — | — | 9,936 | — |
|  | 35° | — | — | 46,992 | 14,808 | — |
|  | 40° | — | — | 48,427 | 20,603 | — |
|  | 45° | — | — | 56,099 | 25,945 | 29,022 |
|  | 50° | — | — | 60,325 | 21,936 | 36,414 |
|  | 55° | — | 66,136 | 62,910 | 30,751 | 39,177 |
|  | 60° | — | 65,854 | 64,271 | 39,543 | 43,344 |
|  | 65° | — | 65,973 | 73,602 | 43,117 | 53,758 |
|  | 70° | — | 68,520 | 76,913 | 49,397 | 71,816 |
|  | 75° | 93,205 | 78,899 | 82,677 | 53,598 | 89,150 |
|  | 80° | 88,764 | 80,303 | 94,056 | 56,419 | 127,188 |
|  | 85° | 97,933 | 83,370 | 102,011 | 75,688 | 181,610 |
|  | 90° | 96,323 | 85,906 | 102,402 | 100,347 | — |
|  | 95° | 96,649 | 90,316 | 110,420 | 140,194 | — |
|  | 100° | 110,856 | 92,899 | 114,296 | 195,448 | — |
|  | 105° | 105,763 | 91,133 | 137,577 | — | — |
|  | 110° | 110,474 | 102,126 | 145,746 | — | — |

TABLE 4-continued

| | Light incident surface angle ($\Theta_1$) | | | | |
|---|---|---|---|---|---|
| | 15° | 35° | 55° | 75° | 90° |
| 115° | 119,485 | 109,450 | 203,356 | — | — |
| 120° | 125,215 | 108,308 | 227,800 | — | — |
| 125° | 135,675 | 120,869 | — | — | — |
| 130° | 134,354 | 112,031 | — | — | — |

As shown in Table 3, FIG. 11, Table 4, and FIG. 12, the effective range of the apex angle $\Theta_2$ of the engraved pattern 110 in the range of 15° to 90° of the light incident surface angle $\Theta_1$ is 30° to 125°. However, the effective range of the apex angle $\Theta_2$ in consideration of correlation between the light incident surface angle $\Theta_1$ and the apex angle $\Theta_2$ is 70° to 125°, preferably 75° to 115°.

Furthermore, Table 5 below shows a test result obtained by comparing the luminous intensity of light output between Example of the present invention in which the radius of curvature of the lower curved line 101a positioned at the lower end of the light incident surface 101 on the plane, that is, the radius of curvature of the light incident surface having the predetermined curvature is one of 25 μm, 50 μm, 75 μm, 100 μm, 125 μm, and 150 μm and Comparative Example 1 in a state in which the incident angle $\Theta_1$ of the engraved pattern 110 is fixed at 35°, the apex angle $\Theta_1$ is fixed at 105°, and the rear surface angle $\Theta_3$ is fixed at 40°.

It is to be noted that Comparative Example 1 is a light guide plate according to the related art in which multiple laser dotted patterns are formed on a lower surface thereof, and the dotted patterns of Comparative Example 1 have a radius of curvature of 50 μm on the plane and a radius of curvature of 4 μm on the vertical section.

Figure 13:
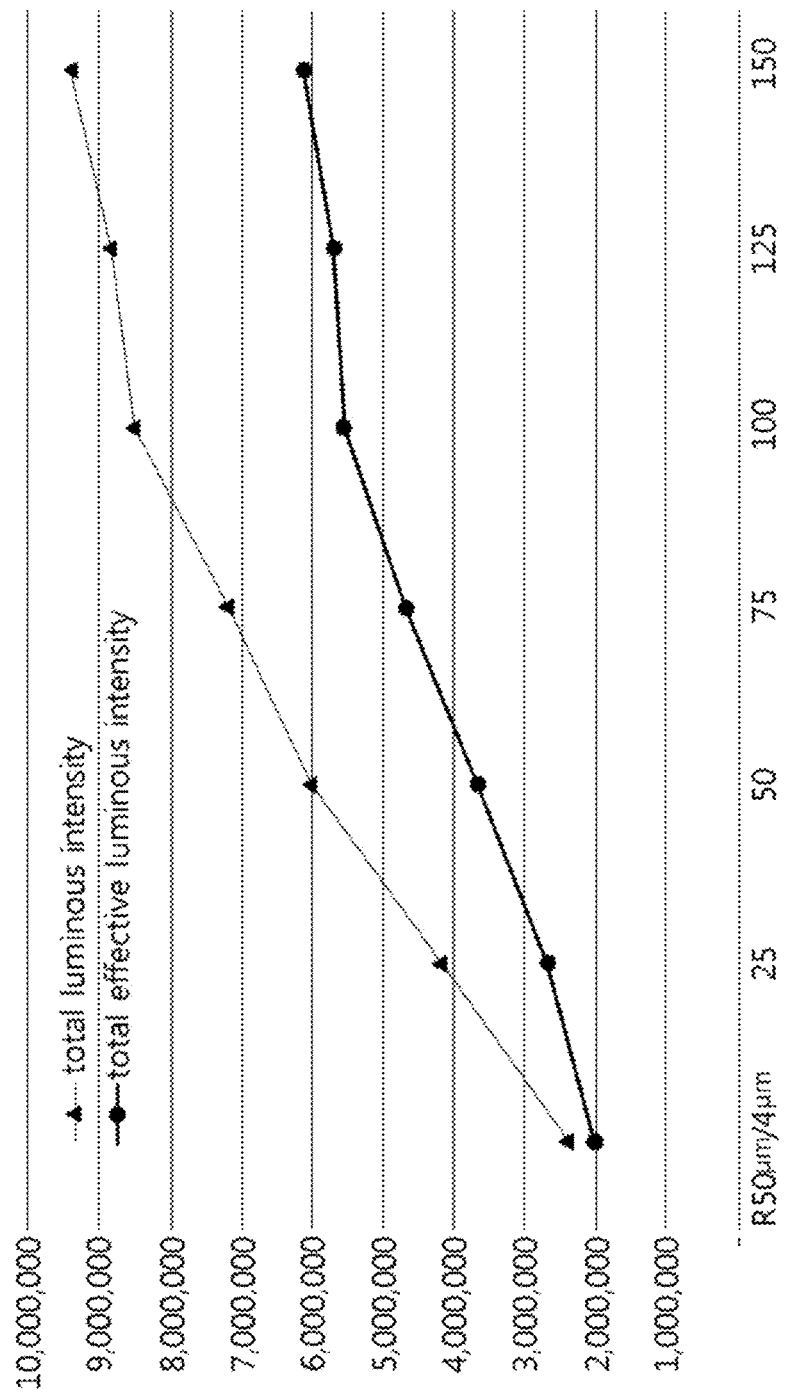
FIG. 13 is a graph of Table 5.

Furthermore, FIG. 13 is a graph showing the luminous intensity of light output when the radius of curvature of the light incident surface is one of 25 μm, 50 μm, 75 μm, 100 μm, 125 μm, and 150 μm in Example of the present invention having the engraved pattern 110 with a light incident surface angle $\Theta_1$ of 35°, an apex angle $\Theta_2$ of 105°, a rear surface angle $\Theta_3$ of 40°.

In other words, FIG. 13 is a graph of Table 5.

TABLE 5

| | Radius of Curvature | Horizontal luminous intensity | Vertical luminous intensity | Total luminous intensity | Total effective luminous intensity |
|---|---|---|---|---|---|
| Comparative Example | R50 μm/ 4 μm | 129,816 | 71,130 | 239,651 | 200,945 |
| Example | 25 μm | 172,653 | 94,218 | 415,397 | 266,871 |
| | 50 μm | 236,346 | 129,637 | 601,747 | 365,983 |
| | 75 μm | 304,481 | 161,785 | 717,561 | 466,266 |
| | 100 μm | 363,258 | 192,911 | 851,237 | 556,169 |
| | 125 μm | 372,507 | 195,969 | 882,261 | 568,475 |
| | 150 μm | 397,427 | 212,880 | 940,353 | 610,307 |

As can be seen from Table 5 and FIG. 13, as the radius of curvature of the lower curved line 101a on the plane that is positioned at the lower end of the light incident surface of the engraved pattern increases, the brightness value of the backlight unit is larger than that of Comparative Example 1 in which conventional laser dotted patterns are applied.

However, when the radius of curvature of the engraved pattern 110 exceeds 150 μm, the engraved pattern has a size of equal to or greater than 130 μm, which may cause the engraved pattern 110 to be visible on the screen of the backlight unit.

Accordingly, it is preferable that the lower curved line 101a of the engraved pattern 110 has a radius of curvature of equal to or less than 3 μm to 150 μm.

On the other hand, it is to be noted that a display device according to the present invention is a display device including the light guide plate member 100 according to the present invention, and an embodiment of the light guide plate member 100 remains the same as the one described above, and thus a detailed description thereof is omitted herein.

Figure 14:
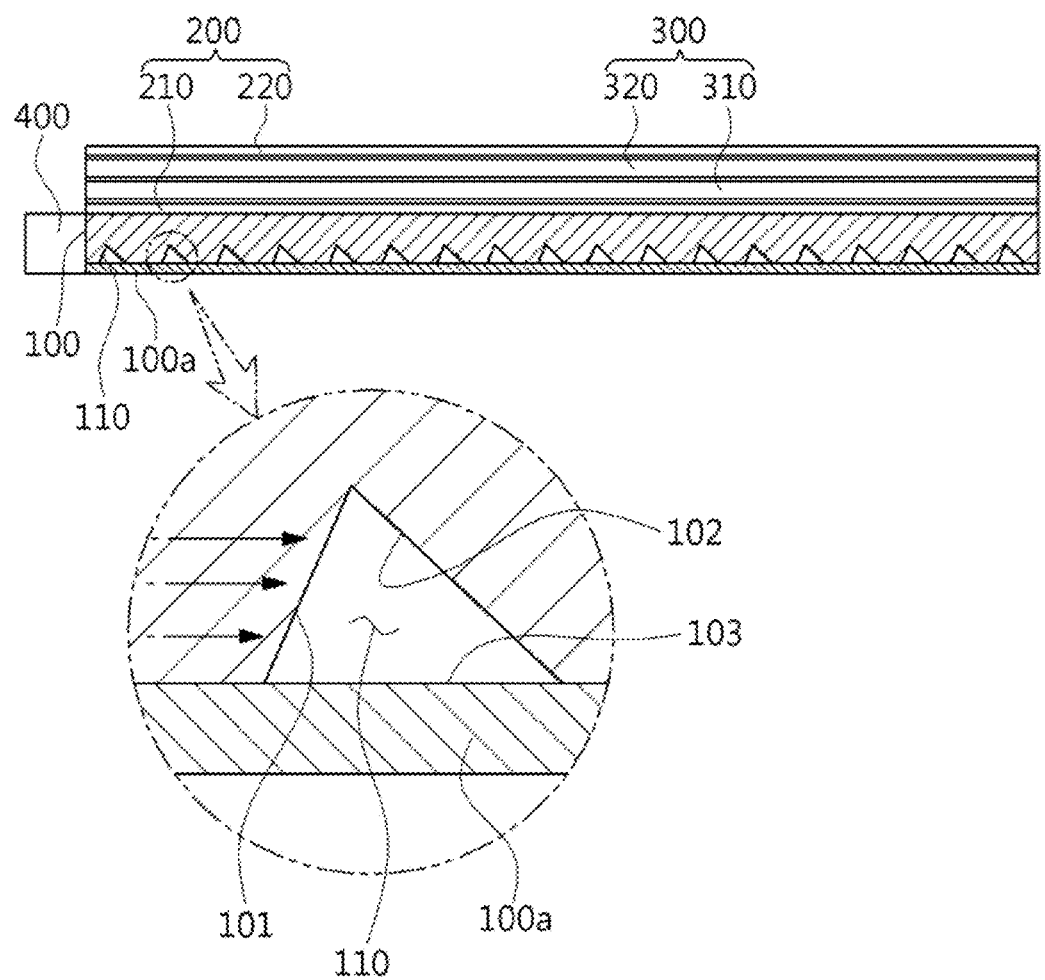
FIG. 14 is a sectional view showing a first embodiment of a backlight unit according to the present invention.

Meanwhile, FIG. 14 is a sectional view showing a first embodiment of a backlight unit according to the present invention. Referring to FIG. 14, the backlight unit according to the first embodiment of the present invention includes a light source emitting light, a light guide plate member 100 has a side surface on which the light source is positioned and allowing light of the light source incident upon the side surface thereof to be output to an upper surface thereof, a diffusion sheet 200 positioned on the light guide plate member 100 and diffusing light, and a prism sheet 300 positioned on the diffusion sheet 200 and configured to refract and condense light.

The light guide plate member 100 may have a reflection plate member positioned on a lower surface thereof.

The light guide plate member 100 has multiple engraved patterns 110 positioned on the lower surface thereof and arranged to be spaced apart from each other. Each of the engraved patterns 110 is configured such that an arc-shaped light incident surface thereof that is oriented toward the light source has a predetermined curvature on a plane.

Furthermore, the engraved pattern 110 has a triangular vertical section taken along the straight line passing through the center of the light incident surface of the engraved pattern.

The light guide plate member 100 is configured such that a curved light incident surface of the engraved pattern is positioned toward the light source, and the curved light incident surface is convex in a direction toward a side surface of a light guide plate, that is, a light incident surface of the light guide plate facing the light source.

It is to be noted that the embodiment of the engraved pattern 110 remains the same as that of the second embodiment of the light guide plate having the engraved pattern according to the present invention as described above, and thus is omitted herein.

Furthermore, it is to be noted that the light source is a cold cathode fluorescent lamp (CCFL) or a light emitting diode (LED) as an example and may be variously modified as a light source used in a known backlight unit.

The prism sheet 300 includes a first prism sheet portion 310 and a second prism sheet portion 320 positioned on the first prism sheet portion 310.

The first prism sheet portion 310 may have multiple first prism portions protruding from an upper surface of a base material at positions spaced apart from each other. The second prism sheet portion 320 may have multiple second prism portions protruding from the upper surface of the base material at positions spaced apart from each other in directions different from the first prism portion.

As an example, the first prism portions are arranged to be spaced apart from each other in an X axis direction, and the second prism portions are arranged to be spaced apart from each other in a Y axis direction.

It is to be noted that the prism sheet 300 is variously modified and implemented as a known prism sheet structure.

The diffusion sheet 200 includes a lower diffusion sheet 210 positioned between the light guide plate member 100 and the prism sheet 300 and diffusing light, and an upper diffusion sheet 220 laminated on the prism sheet 300 and diffusing light.

Tests for analyzing the brightness of Examples 1 to 3 of the present invention and Comparative Example 2 were performed as follows. The results are shown in Table 6 below.

It is to be noted that the following Examples 1 to 3 are backlight units to which the light guide plate having the engraved pattern 110 according to the present invention is applied, and the following Comparative Example 2 is a backlight unit to which the light guide plate of Comparative Example 1 used in Table 5 is applied, that is, a backlight unit to which the light guide plate according to the related art in which hemispherical laser dotted patterns are arranged to be spaced apart from each other is applied.

More specifically explained, in Examples 1 to 3, the engraved pattern 110 to which the light incident surface angle $\Theta_1$ is 35°, the apex angle $\Theta_2$ is 105°, the rear surface angle $\Theta_3$ is 40°, and the radius of curvature is 55 μm is equally applied.

Furthermore, it is to be noted that in the backlight unit of Examples 1 to 3 and the backlight unit of Comparative Example, the light source, the diffusion sheet, the prism sheet, and a reflector except for the light guide plate are equally applied.

Figure 15:
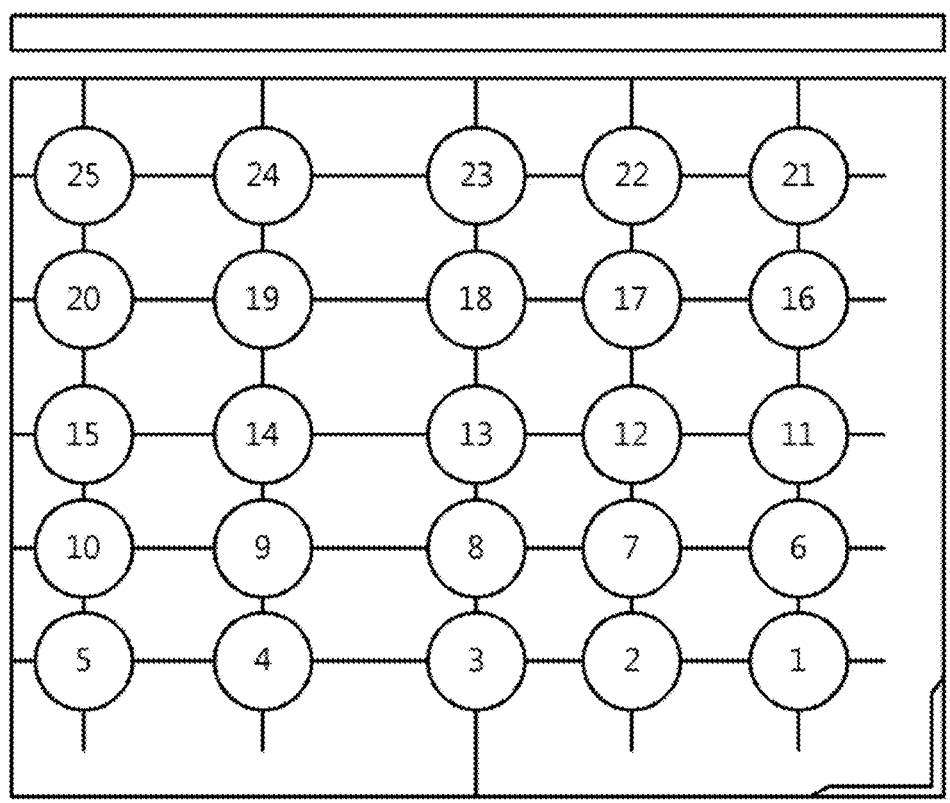
FIG. 15 is a plan view showing points at which brightness is measured in a brightness measurement test of Examples of the backlight unit according to the present invention and Comparative Examples.

FIG. 15 is a plan view showing points at which brightness is measured in a brightness measurement test of Examples of the backlight unit according to the present invention and Comparative Examples, and it is to be noted that the points can be ascertained in the following Table 6.

TABLE 6

| | Comparative Example 2 | Example 1 | Example 2 | Example 3 |
|---|---|---|---|---|
| Point 1 brightness value | 6176 | 6075 | 6080 | 5609 |
| Point 2 brightness value | 6172 | 7348 | 7165 | 7357 |
| Point 3 brightness value | 6384 | 7220 | 7517 | 7430 |
| Point 4 brightness value | 6492 | 6942 | 7245 | 7420 |
| Point 5 brightness value | 5948 | 5508 | 5766 | 5753 |
| Point 6 brightness value | 5247 | 8310 | 8265 | 8376 |
| Point 7 brightness value | 7126 | 8789 | 8820 | 8991 |
| Point 8 brightness value | 7344 | 8383 | 8422 | 8510 |
| Point 9 brightness value | 7459 | 8831 | 8541 | 8706 |
| Point 10 brightness value | 5977 | 7993 | 8029 | 8115 |
| Point 11 brightness value | 5141 | 8494 | 8440 | 8595 |
| Point 12 brightness value | 7066 | 8973 | 8725 | 8395 |

TABLE 6-continued

| | Comparative Example 2 | Example 1 | Example 2 | Example 3 |
|---|---|---|---|---|
| Point 13 brightness value | 7359 | 8623 | 8425 | 8279 |
| Point 14 brightness value | 7434 | 8781 | 8301 | 8541 |
| Point 15 brightness value | 6071 | 8546 | 8173 | 8122 |
| Point 16 brightness value | 5462 | 7516 | 7527 | 7418 |
| Point 17 brightness value | 6413 | 7355 | 7200 | 7363 |
| Point 18 brightness value | 6674 | 8052 | 7768 | 7766 |
| Point 19 brightness value | 7014 | 7535 | 7556 | 7252 |
| Point 20 brightness value | 5530 | 7247 | 6902 | 6762 |
| Point 21 brightness value | 5092 | 6534 | 6810 | 6489 |
| Point 22 brightness value | 5698 | 6495 | 6648 | 6510 |
| Point 23 brightness value | 5780 | 5895 | 5991 | 5862 |
| Point 24 brightness value | 6062 | 5815 | 6074 | 6209 |
| Point 25 brightness value | 5878 | 6221 | 6002 | 5858 |
| Point 1 to Point 25 average brightness value | 6456 | | 7443 | |
| Point 1 to Point 25 uniformity | 65% | | 61% | |

As can be seen from Table 6, it was found that the backlight units of Examples 1 to 3 of the present invention were larger in brightness value than the backlight unit of Comparative Example 2, that is, the backlight unit of Comparative Example 2 using the light guide plate according to the related art. In other words, the backlight units of Examples 1 to 3 of the present invention were 13% larger in luminous intensity than Comparative Example 2.

In other words, according to the present invention, the engraved pattern 110 is configured such that the light incident surface thereof has an arc shape on the plane and the vertical section thereof taken along the straight line passing through the center of the light incident surface of the engraved pattern is triangular. This makes it possible to maximize total reflection efficiency to increase luminous intensity of light output, resulting in improved light use efficiency and enhanced brightness of the backlight unit.

Figure 16:
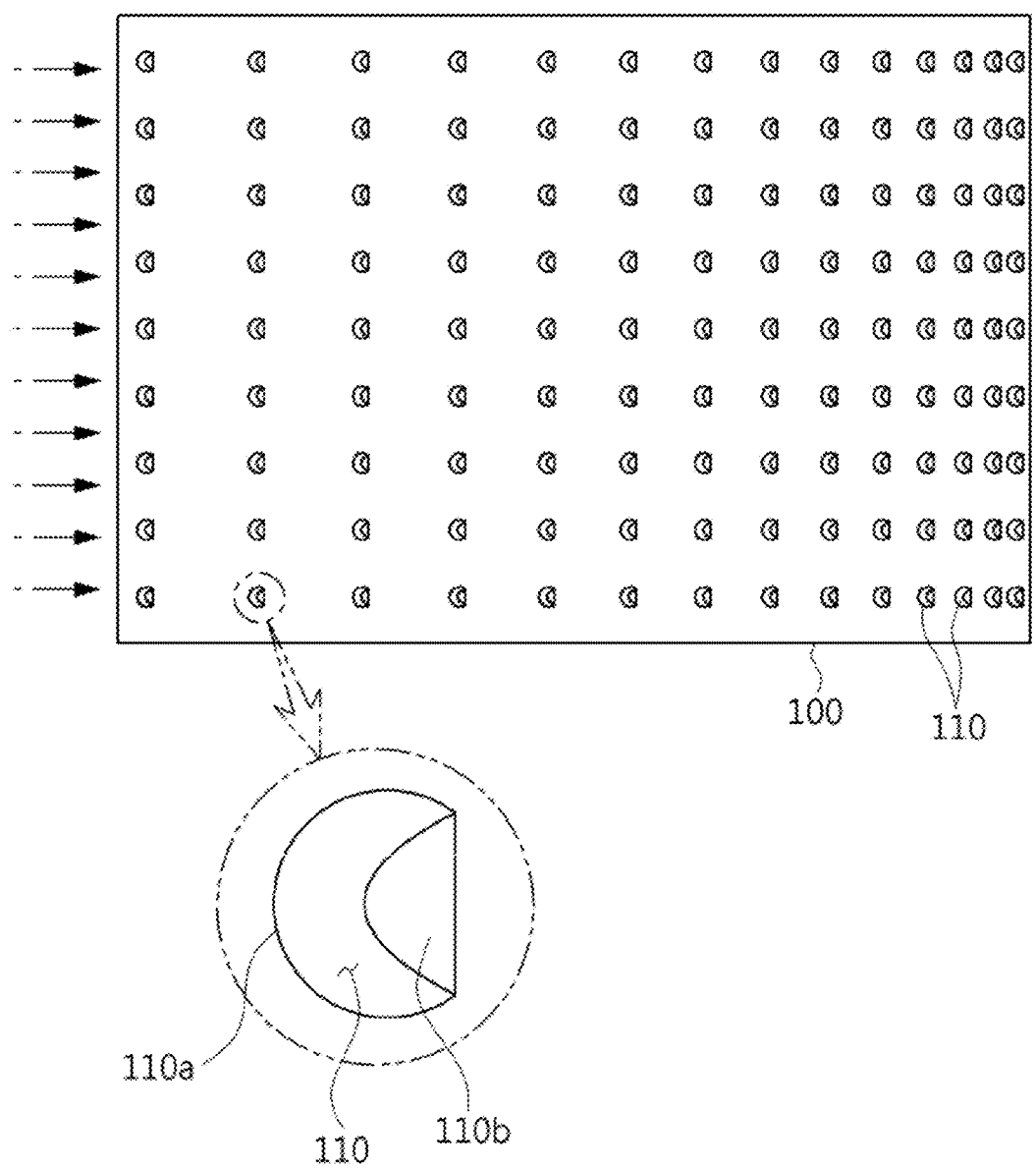
FIG. 16 is a bottom view showing a second embodiment of the light guide plate having the engraved pattern according to the present invention.
Figure 17:
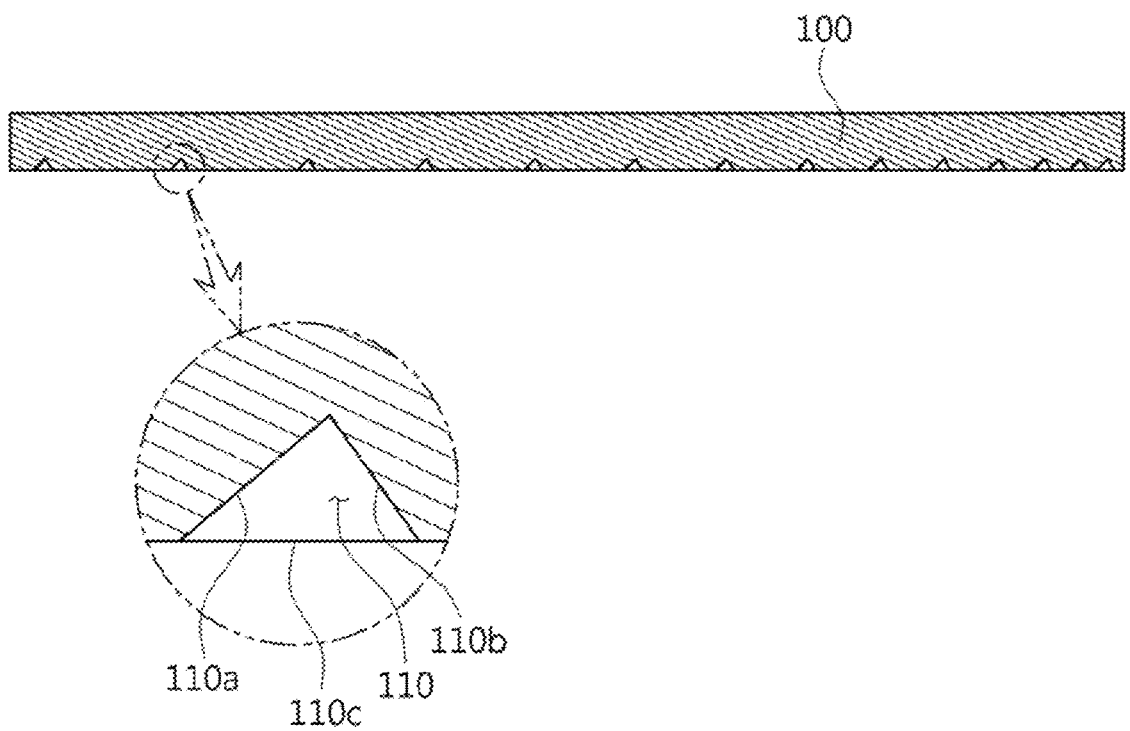
FIG. 17 is a sectional view showing the second embodiment of the light guide plate having the engraved pattern according to the present invention.
Figure 18A:
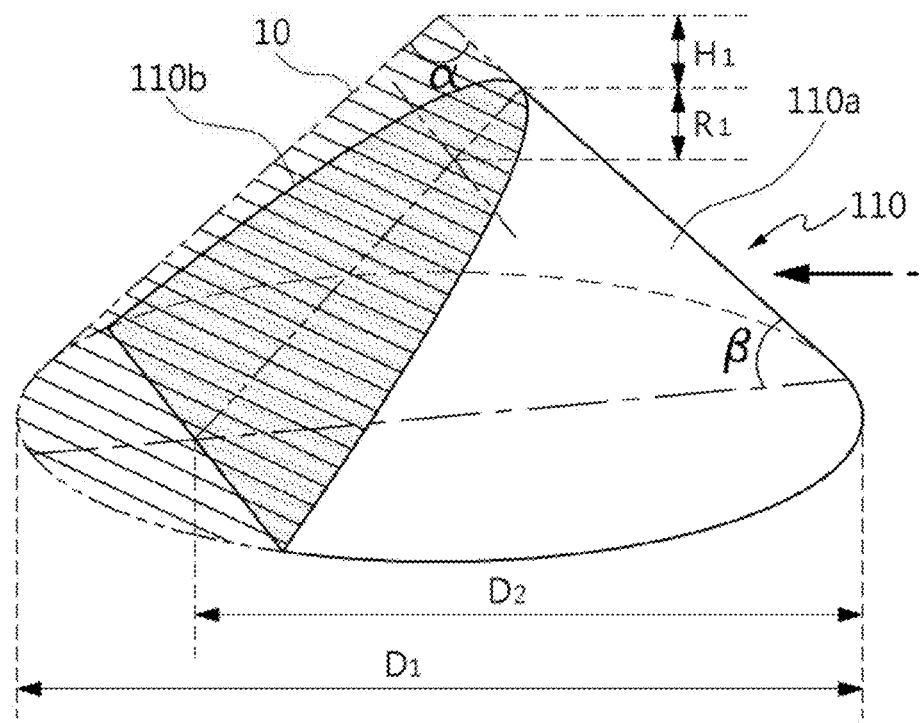
FIGS. 18A and 18B are perspective views showing the engraved pattern in the second embodiment of the light guide plate having the engraved pattern according to the present invention.
Figure 18B:
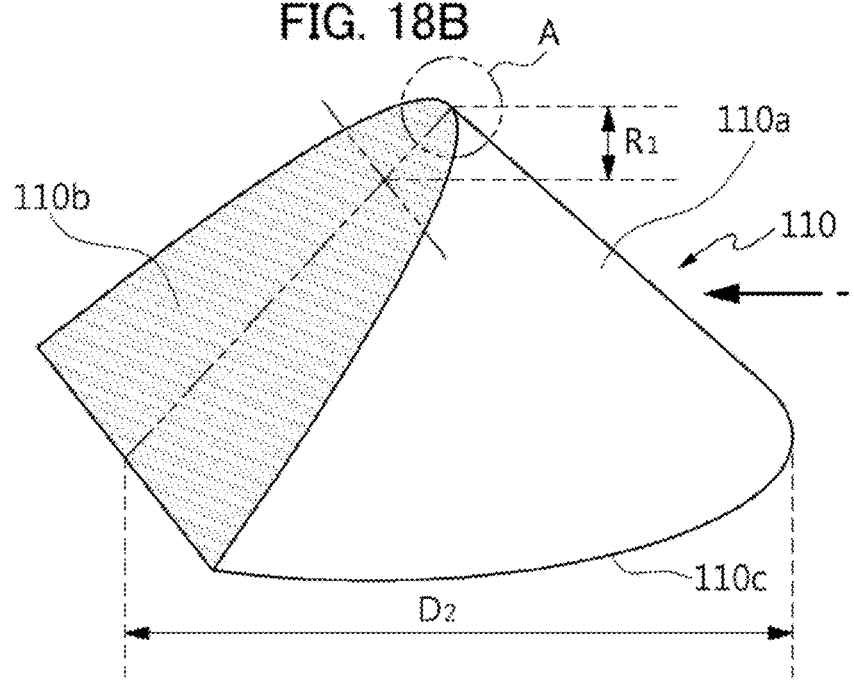
Figure 19:
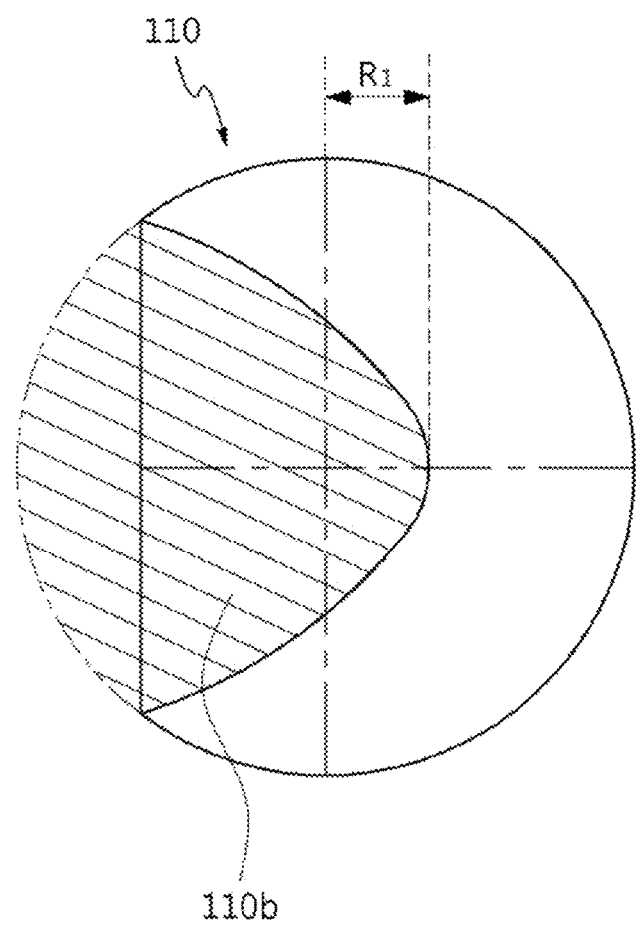
FIG. 19 is an enlarged plan view of a portion A in FIG. 18B.

FIG. 16 is a bottom view showing the second embodiment of the light guide plate having the engraved pattern according to the present invention, FIG. 17 is a sectional view showing the second embodiment of the light guide plate having the engraved pattern according to the present invention, FIGS. 18A and 18B are perspective views showing the engraved pattern in the second embodiment of the light guide plate having the engraved pattern according to the present invention, and FIG. 19 is an enlarged plan view of a portion A in FIG. 18B.

The second embodiment of the light guide plate having the engraved pattern according to the present invention will be described in detail below with reference to FIGS. 16 to 19.

The second embodiment of the light guide plate having the engraved pattern according to the present invention is configured such that the engraved pattern 110 positioned on the lower surface of the light guide plate member 100 is a conical pattern formed by partially cutting a basic cone 10 to have a slant surface 110b at a side thereof.

As an example, the basic cone 10 has a conical shape with a sharp apex, a circular base, a curved side, an internal apex angle α of 95° to 125°, and a diameter $D_1$ of the base of 50 μm to 130 μm.

Furthermore, as an example, an internal inclination angle of the side of the basic cone 10, that is, the inclination angle of the side with respect to the base is 25° to 60°. The internal inclination angle of the side of the basic cone 10 is a light incident surface angle β of the conical pattern.

Furthermore, as an example, the conical pattern is a partially-cut conical shape formed by slantly cutting the basic cone 10 such that a portion that is to be cut out includes the apex, thus forming the planar slant surface 110b at a side thereof.

As an example, the basic cone 10 is slantly cut such that a portion thereof to be cut out includes the apex and a portion of the base thereof, forming a conical pattern, and the conical pattern is a conical shape partially cut to have the planar slant surface 110b at a side thereof.

FIG. 18A is a view showing the basic cone 10, and FIG. 18B is a view showing the conical pattern of the present invention in a solid figure from which a hatched portion of the basic cone 10 of FIG. 18A is cut out.

Furthermore, as an example, a height difference H1 between the apex of the conical pattern and the basic cone 10 is 7 μm to 23 μm.

It is to be noted that the height difference H1 between the apex of the conical pattern and the basic cone 10 may be varied according to the light incident surface angle β, the internal apex angle of the conical pattern, and the lower radius of curvature, that is, the radius of curvature of the base of the basic cone 10.

Furthermore, as an example, an apex portion of the conical pattern has an arc having a radius of curvature R1 of 45 μm to 125 μm.

Furthermore, as an example, the conical pattern has an internal apex angle of 75° to 115°.

Furthermore, as an example, the conical pattern is configured such that a straight line passing through the center of the slant surface 110b thereof intersects a straight line passing through the center of the base thereof.

As an example, the internal inclination angle of the side of the basic cone 10, that is, the inclination angle of the side with respect to the base, which is the light incident surface angle β of the conical pattern, is 25° to 60°.

Furthermore, as an example, the conical pattern has a circular shape configured such that when drawing a circle by continuing the arc of the base thereof, the circle has a diameter of 40 μm to 130 μm.

The light guide plate member 100 has multiple conical patterns formed on the lower surface thereof. The conical patterns are positioned such that the density thereof gradually increases from the light incident surface of the light guide plate member at which the light source is positioned to a second side surface of the light guide plate member.

In other words, the light guide plate member 100 is positioned such that the number of the conical patterns gradually increases from a first side of the lower surface thereof where the light incident surface is positioned to a second side of the lower surface.

This is because the amount light decreases as the distance from the light incident surface of the light guide plate member at which the light source is positioned increases. Accordingly, gradually increasing the density of the conical patterns as the distance from the light incident surface of the light guide plate member increases makes it possible for light to be evenly distributed on the entire surface of the light guide plate member 100.

Furthermore, the conical pattern is configured such that a curved surface 110a thereof is positioned toward the light incident surface of the light guide plate member and the slant surface 110b thereof is positioned in a direction opposite to the light incident surface of the light guide plate member, that is, at the opposite side of the light incident surface of the light guide plate member.

It was found that when the slant surface 100b is positioned toward the light incident surface of the light guide plate member, a brightness enhancement effect and a reduction in light lines occurring at the light incident surface of the light guide plate are not improved compared to a conventional dotted pattern, which will be described in more detail below.

As an example, the second embodiment of the light guide plate having the engraved pattern according to the present invention is manufactured by roll stamping with an electro-forming stamp having a conical protrusion formed in a shape corresponding to the conical pattern.

The conical protrusion is not shown in the drawings, but as an example, is formed in the same shape as that of FIG. 3 or FIG. 18B showing the conical pattern as a three-dimensional figure.

In other words, the conical protrusion is a partially-cut conical shape formed by slantly cutting the basic cone 10 such that the portion thereof to be cut out includes the apex, thus forming the planar slant surface 110b at the side thereof.

As an example, the basic cone 10 has a conical shape with a sharp apex, a circular base, a curved side, an internal apex angle of 95° to 125°, and a diameter of the base of 40 μm to 130 μm.

Furthermore, as an example, an internal inclination angle of the side of the basic cone 10, that is, the inclination angle of the side with respect to the base, which is a light incident surface angle β of the conical pattern, is 25° to 60°.

Furthermore, as an example, the conical protrusion is a partially-cut conical shape formed by inclinedly cutting the basic cone 10 such that the portion thereof to be cut out includes the apex and a portion of the base thereof, thus forming the inclined surface 110b at a side thereof.

Furthermore, as an example, a height difference between the apex of the conical protrusion and the basic cone 10 is 7 μm to 23 μm, and the height of the conical pattern, that is, the depth of the engraved pattern 110 is 4 μm to 12 μm.

Furthermore, as an example, an apex portion of the conical protrusion is has an arc having a radius of curvature of 45 μm to 125 μm.

Furthermore, as an example, the conical protrusion h has an internal apex angle of 75° to 115°.

Furthermore, as an example, the conical protrusion is configured such that a straight line passing through the center of the slant surface 110*b* thereof intersects a straight line passing through the center of the base thereof to form an intersecting point.

Furthermore, as an example, the conical pattern has a circular shape configured such that when drawing a circle by continuing the arc of the base thereof, the circle has a diameter of 40 μm to 130 μm, that is, a curved line of the base has a radius of curvature of 40 μm to 130 μm.

As an example, the light guide plate member 100 according to the present invention is manufactured by roll stamping in which the electroforming stamp having multiple conical protrusions is wound on a stamping roll and an optical panel body made of a transparent synthetic resin such as polymethyl methacrylate (PMMA), polycarbonate (PC) and methyl methacrylate-co-styrene (MS) is transferred to a conveyor and compressed by the electroforming stamp while the stamping roll is rotated, thus forming multiple conical patterns on the optical panel body.

It is to be noted that the electroforming stamp is manufactured such that a conical pattern is designed and then protruding multiple conical patterns are formed and can be variously manufactured through a process of manufacturing a known embossed stamp.

In other words, engraved conical patterns corresponding to the embossed conical protrusions are formed on the lower surface of the light guide plate member 100 by roll stamping using the stamping roll on which the electroforming stamp having the embossed conical protrusions.

Meanwhile, it is to be noted that a display device according to the present invention is a display device including the light guide plate member 100 according to the present invention, and an embodiment of the light guide plate member 100 remains the same as the one described above, and thus a detailed description thereof is omitted herein.

Furthermore, it is to be noted that the light guide plate member 100 according to the present invention can be widely applied to an LCD module, a lighting device, and the like in addition to a known display device to which a light guide plate is applied.

Figure 20:
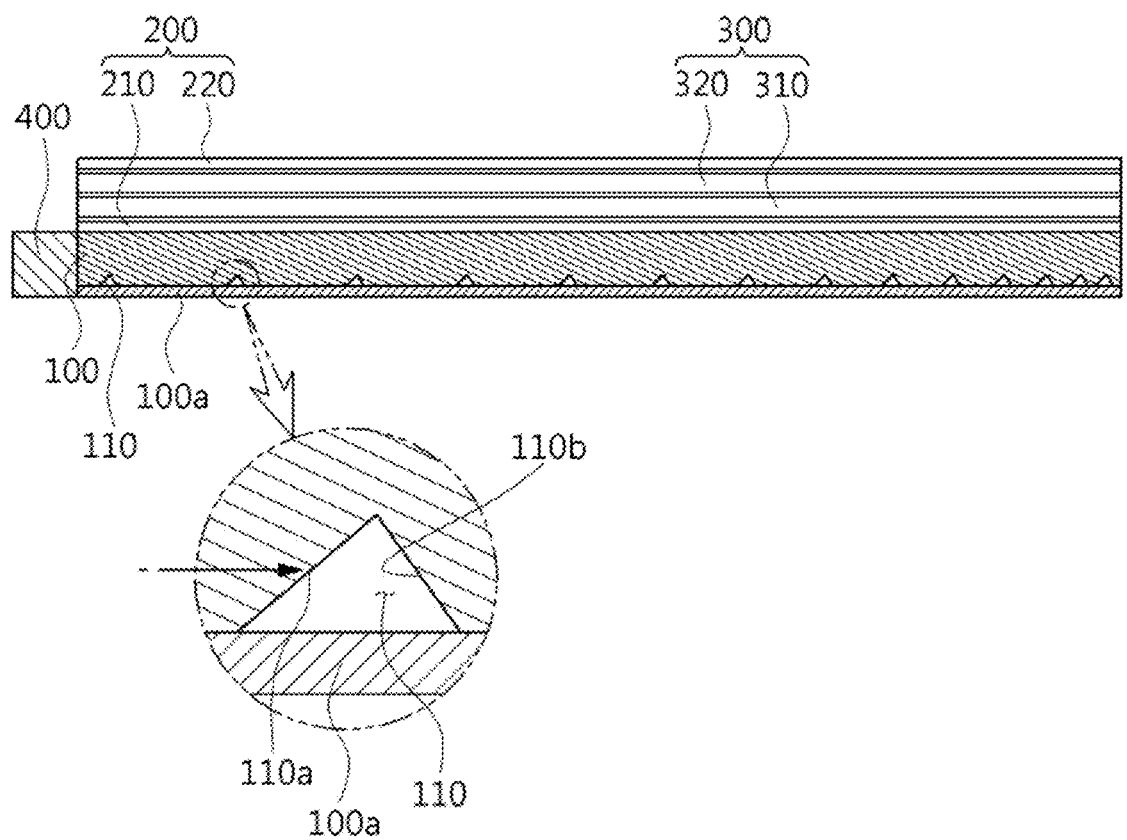
FIG. 20 is a sectional view showing a second embodiment of the backlight unit according to the present invention.

FIG. 20 is a sectional view showing a second embodiment of the backlight unit according to the present invention. Referring to FIG. 20, in the second embodiment of the backlight unit according to the present invention, the engraved pattern 110 positioned on the lower surface of the light guide plate is the conical pattern formed by partially cutting the basic cone to have the slant surface 110*b* at the side thereof.

The conical pattern is the partially-cut conical shape formed by slantly cutting the basic cone 10 such that the portion that is to be cut out includes the apex, thus forming the planar slant surface 110*b* at a side thereof and is configured such that the curved surface 110*a* thereof is positioned toward the light source and the slant surface 110*b* thereof is positioned opposite to the light source.

In other words, the light guide plate member 100 is configured such that the curved surface 110*a* of the conical pattern is positioned with an axis passing the center of the curved surface 110*a* being perpendicular to the light incident surface of the light guide plate member at which the light source is positioned, and the slant surface 110*b* is positioned at the opposite side with an axis passing the center of the slant surface 110*b* being perpendicular to the light incident surface of the light guide plate member.

It is to be noted that an embodiment of the conical pattern remains the same as that of the light guide plate having the engraved pattern according to the invention described above and thus is omitted herein.

Tests for analyzing brightness of Example 4 and Example 5 and Comparative Examples 3 to 6 of the present invention were performed as follows. The results are shown in Table 7 below.

Furthermore, FIG. 15 is a plan view showing points at which brightness is measured in a brightness measurement test of Example 4 and Example 5 of the backlight unit according to the present invention and Comparative Example 3 to 6.

It is to be noted that Example 4 and Example 5 of the backlight unit according to the present invention are examples to which the same conical pattern and the same light guide plate having the engraved pattern according to the present invention are applied in addition to the same light source, the same diffusion sheet 200, and the prism sheet 300.

It is to be noted that Example 4 is an example in which a known ESR reflector is employed as a reflector member 100*a* positioned on a lower portion of the light guide plate member 100, and Example 5 is an example in which a known white reflector is employed as a the reflector member 100*a* positioned on the lower portion of the light guide plate member 100.

In the cone pattern applied to the light guide plate member 100 of Example 4 and Example 5, the basic cone 10 has an interior apex angle of 105°, a diameter of the lower surface of 94 μm, and an internal inclination angle of 37.5°.

As an example, the conical pattern applied to the light guide plate member 100 of Example 4 and Example 5 has a shape formed by cutting the basic cone 10 with a plane parallel to the side of the basic cone such that the portion of the basic cone that is to be cut out includes the apex and the portion of the base thereof, has a height 20 μm lower than the height of the basic cone 10, and has an apex portion having an arc with a radius of curvature of 26 μm, wherein the radius of curvature of the curved line of the base, that is, the diameter to the intersecting point where the straight line passing through the center of the base and the straight line passing through the center of the slant surface 110*b* intersects, which is a distance $D_2$ of the base on a straight line passing through the center of the base and meeting the slant surface 110*b*, is 70 μm.

Furthermore, the conical pattern applied to the light guide plate member 100 of Example 4 and Example 5 is configured such that the curved surface 110*a* is positioned toward the light incident surface of the light guide plate member at which the light source is positioned and the slant surface 110*b* is positioned in the direction opposite to the light incident surface of the light guide plate member, that is, at the opposite side of the light incident surface of the light guide plate member. More specifically explained, the conical pattern is configured such that the center of the curved surface 110*a* is positioned in a direction perpendicular to the light incident surface of the light guide plate member at which the light source is positioned, and the center of the slant surface 110*b* positioned at the opposite side is also in the direction perpendicular to the light incident surface of the light guide plate member.

In other words, light from the light source is emitted toward the curved surface 110*a* of the conical pattern in a direction perpendicular to the curved surface 110*a*.

Furthermore, the backlight unit of Comparative Example 3 and Comparative Example 4 is a backlight unit to which a known light guide plate having multiple dome-shaped grooves, that is, hemispherical grooves formed in a dotted pattern is applied, and the light source, the diffusion sheet 200, and the prism sheet 300 that are the same as those of Example 4 and Example 5 are applied.

It is to be noted that Comparative Example 3 is an example in which the known ESR reflector is employed as the reflector member 100a positioned on the lower surface of the light guide plate, and Comparative Example 2 is an example in which a known white reflector is employed as the reflector member 100a positioned on the lower surface of the light guide plate.

Furthermore, Comparative Example 5 has the same condition as that of Example 4 except that the slant surface 110b of side the conical pattern of the light guide plate member 100 is positioned toward the light incident surface of the light guide plate member at which the light source is positioned, and the curved surface 110a is positioned at the opposite side. Comparative Example 6 is the same as Example 5 except that the slant surface 110b of the side of the conical pattern of the light guide plate member 100 is positioned toward the light incident surface of the light guide plate member at which the light source is positioned, and the curved surface 110a is positioned at the opposite side.

In other words, the conical patterns of Comparative Example 5 and Comparative Example 6 are the conical patterns formed in the same shape as those of Example 4 and Example 5 and are positioned in opposite directions such that the slant surface 110b side of the conical pattern is positioned toward the light incident surface of the light guide plate member at which the light source is positioned, and the curved surface 110a is positioned at the opposite side.

TABLE 7

|  | Example 4 | Example 5 | Comparative Example 3 | Comparative Example 3 | Comparative Example 5 | Comparative Example 6 |
|---|---|---|---|---|---|---|
| Point 1 brightness value | 5332 | 5154 | 5110 | 5981 | 5481 | 5270 |
| Point 2 brightness value | 9929 | 9398 | 6359 | 6717 | 5595 | 5475 |
| Point 3 brightness value | 6038 | 6140 | 6164 | 6148 | 5967 | 5970 |
| Point 4 brightness value | 6104 | 6172 | 6430 | 5945 | 6034 | 5871 |
| Point 5 brightness value | 5307 | 5569 | 5495 | 5220 | 5111 | 5420 |
| Point 6 brightness value | 7549 | 7388 | 5947 | 6092 | 7725 | 6667 |
| Point 7 brightness value | 7561 | 7342 | 6706 | 6535 | 7625 | 6606 |
| Point 8 brightness value | 7747 | 7473 | 7059 | 6832 | 7488 | 6879 |
| Point 9 brightness value | 8023 | 7779 | 6970 | 6750 | 7301 | 7060 |
| Point 10 brightness value | 7413 | 7280 | 6357 | 6019 | 6214 | 6789 |
| Point 11 brightness value | 7307 | 7111 | 5856 | 6426 | 7129 | 6683 |
| Point 12 brightness value | 7733 | 7342 | 6962 | 6715 | 7531 | 6789 |
| Point 13 brightness value | 9012 | 7409 | 7488 | 6968 | 7427 | 6810 |
| Point 14 brightness value | 7757 | 7557 | 7177 | 7069 | 7114 | 6904 |
| Point 15 brightness value | 6884 | 6806 | 6686 | 6192 | 6362 | 6502 |
| Point 16 brightness value | 6666 | 6530 | 5364 | 5860 | 6317 | 6419 |
| Point 17 brightness value | 7093 | 6786 | 6454 | 6112 | 6596 | 6360 |
| Point 18 brightness value | 7410 | 6910 | 7223 | 6519 | 6720 | 6294 |

TABLE 7-continued

| | Example 4 | Example 5 | Comparative Example 3 | Comparative Example 3 | Comparative Example 5 | Comparative Example 6 |
|---|---|---|---|---|---|---|
| Point 19 brightness value | 6719 | 6877 | 6642 | 6409 | 5827 | 6294 |
| Point 20 brightness value | 6219 | 6330 | 6499 | 6086 | 5352 | 5882 |
| Point 21 brightness value | 6374 | 5420 | 4845 | 5664 | 5820 | 5735 |
| Point 22 brightness value | 6130 | 6243 | 5702 | 5610 | 5286 | 5435 |
| Point 23 brightness value | 6410 | 6101 | 5857 | 5622 | 5500 | 5480 |
| Point 24 brightness value | 5902 | 6474 | 6094 | 5562 | 4959 | 5774 |
| Point 25 brightness value | 5210 | 5843 | 5697 | 5238 | 4453 | 5603 |
| Point 13 (center point) brightness value | 9012 | 7409 | 7488 | 6968 | 7427 | 6810 |
| Average brightness value | 6793 | 6617 | 6286 | 6172 | 6277 | 6199 |
| Uniformity | 58% | 66% | 65% | 74% | 58% | 75% |

As can be seen in Table 7, when comparing Example 4 of the present invention and Comparative Example 3 that employ the same reflector member 100a and having the same condition except for the light guide plate, it can be found that the average brightness value for points 1 to 25 of Example 4 is 108.1% on the basis of an average brightness value of 100% for points 1 to 25 of Comparative Example 3. In other words, it can be found that Example 4 of the present invention has a brightness value of about 8% greater than that of Comparative Example 1. Furthermore, when comparing Example 5 of the present invention and Comparative Example 5 that employ the same reflector member 100a and having the same condition except for the light guide plate, it can be found that the average brightness value at points 1 to 25 of Example 5 is 107.2% on the basis of an average brightness value of 100% for points 1 to 25 of Comparative Example 4. In other words, it can be found that Example 5 of the present invention has a brightness value of about 7% greater than that of Comparative Example 2.

On the other hand, when comparing Comparative Example 5 and Comparative Example 3 that have the same condition as Example 4 of the present invention except that the direction of the conical pattern is opposite, that is, the slant surface 110b is positioned toward the light source, it can be found that on the basis of an average brightness value of 100% for points 1 to 25 of Comparative Example 3, the average brightness value at points 1 to 25 of Comparative Example 5 is 99.9%, which is a brightness value that is not significantly different from that of Comparative Example 1.

Furthermore, when comparing Comparative Example 6 and Comparative Example 4 that have the same condition as that of Example 5 except that the direction of the conical pattern is opposite, that is, slant surface 110b is to face the light source, it can be found that on the basis of an average brightness value of 100% for points 1 to 25 of Comparative Example 3, the average brightness value at points 1 to 25 of Comparative Example 6 is 99.9%, which is a brightness value that is not significantly different from that of Comparative Example 4.

In other words, in the light guide plate having the engraved pattern according to the present invention, the conical pattern is configured such that the curved surface 110a faces the light source, and the slant surface 110b is positioned at the opposite side, whereby light of the light source is primarily emitted to the curved surface 110a. This is a key factor of the present invention.

Figure 21:
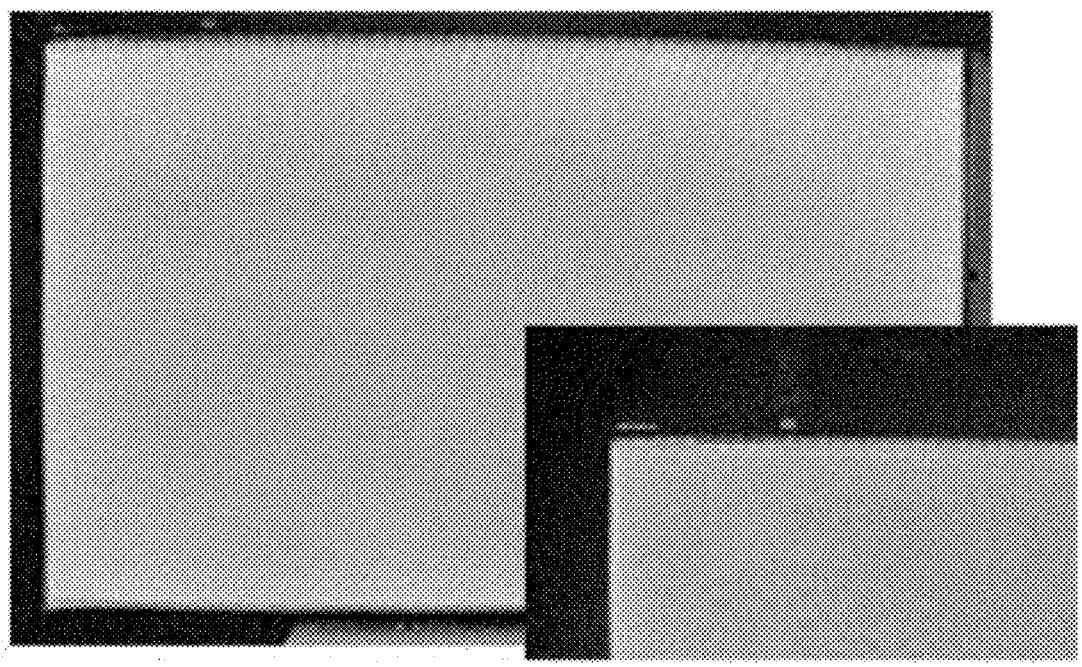
FIG. 21 is a photograph showing light lines for the first embodiment of the backlight unit according to the present invention.
Figure 22:
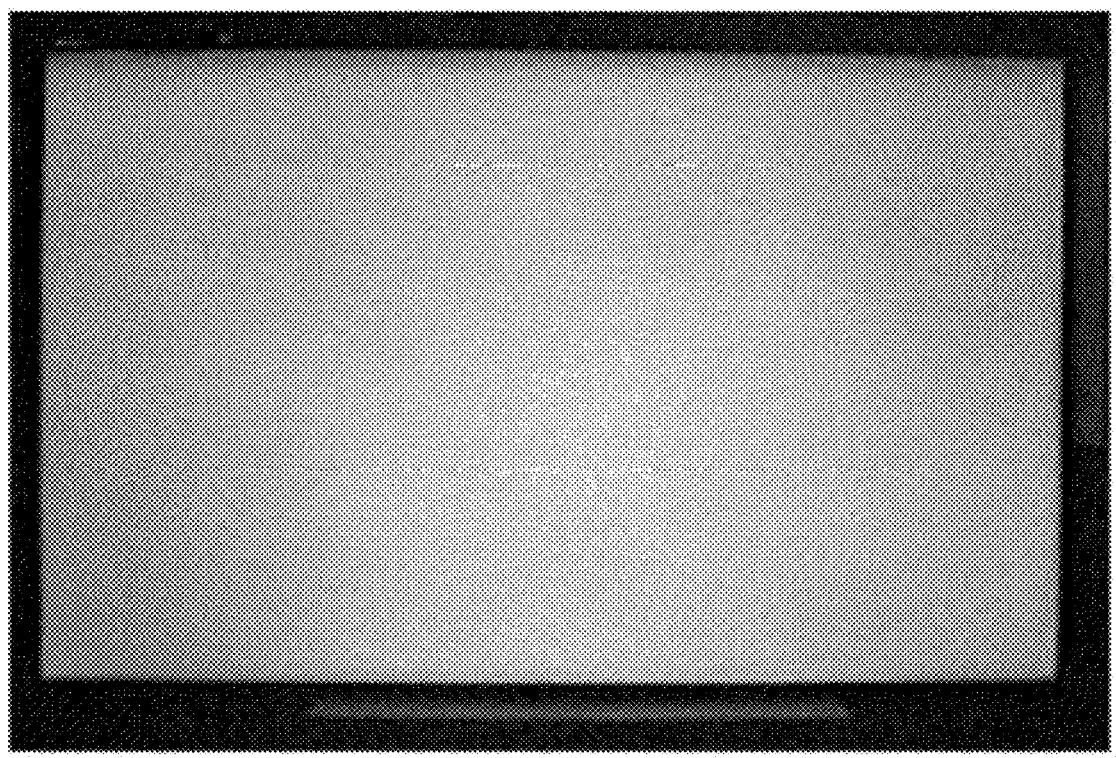
FIG. 22 is a photograph showing light lines for the second embodiment of the backlight unit according to the present invention.

FIG. 21 is a photograph showing an example in which light lines occurring due to the LED light sources is reduced in Example 4, and FIG. 22 is a photograph showing an example in which light lines occurring due to the LED light sources is reduced in Example 5.

Figure 1:
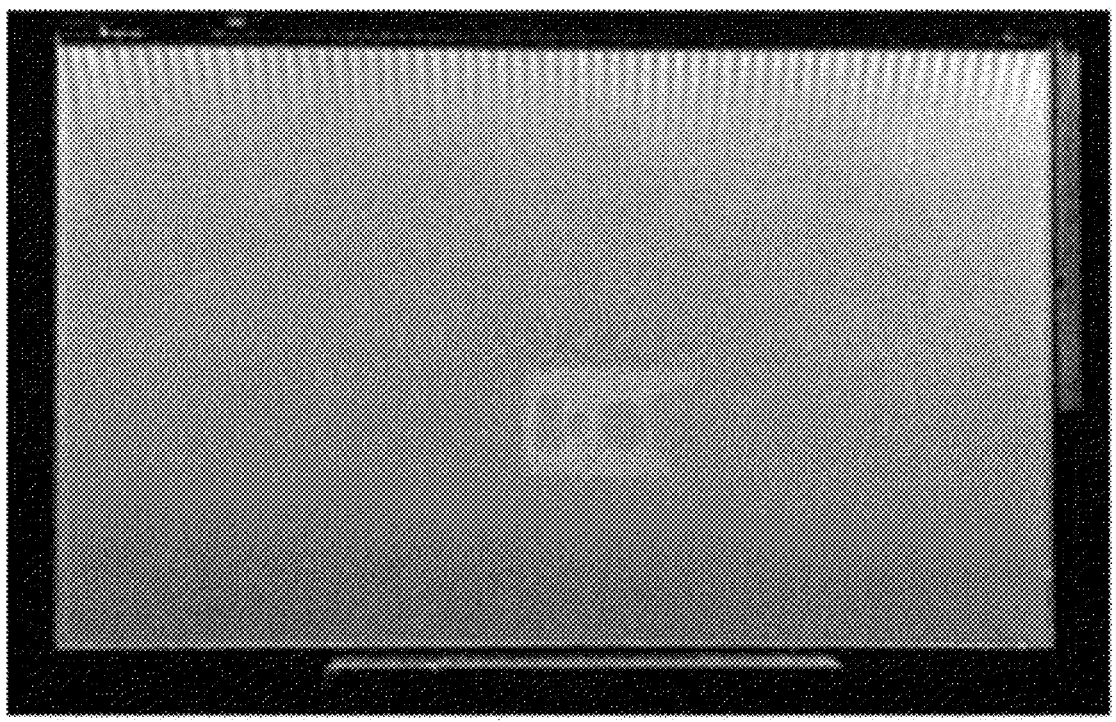
FIG. 1 is a photograph showing light lines that appear on a backlight unit according to the present invention.

In other words, FIG. 1 is a photograph showing light lines occurring due to LED light sources in Comparative Example 1. When comparing FIG. 1 and FIG. 14, and FIG. 1 and FIG. 15, it was found that in Example 4 and Example 5, light lines occurring due to the LED light sources is greatly improved and spaced-apart lines formed due to the LED light sources hardly appear.

According to the present invention, the engraved pattern having the partially-cut conical shape can uniformly scatter light, making it possible to increase brightness of light and thus to increase light efficiency.

According to the present invention, the engraved pattern having the partially-cut conical shape can uniformly scatter light, making it possible to reduce light lines occurring due to intervals of the LED light sources spaced apart from each other.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A light guide plate having an engraved pattern, the light guide plate comprising:

a light guide plate member allowing light of a light source incident upon a first side surface thereof to be output to an upper surface thereof, and having multiple engraved patterns formed in a lower surface thereof and arranged to be spaced apart from each other, wherein each of the engraved patterns is configured such that an arc-shaped light incident surface thereof that is oriented toward the light source has a predetermined curvature on a plane and a vertical section thereof taken along a straight line passing through a center of the light incident surface is triangular, and wherein the light incident surface has an arc-shaped upper curved line positioned at an upper end thereof and having a predetermined curvature on a plane and an arc-shaped lower curved line positioned at a lower end thereof and having a predetermined curvature on a plane, the curvature of the lower curved line being smaller than that of the upper curved line, and the lower curved line has a radius of curvature of 30 μm to 150 μm.

2. The light guide plate of claim 1, wherein the light guide plate member is made of any one material selected from polymethyl methacrylate (PMMA), polycarbonate (PC), methyl methacrylate-co-styrene (MS), silicone, polystyrene (PS), and glass that change a path of light from a line or point light source made up of a light source of a cold cathode fluorescent lamp (CCFL) or a light emitting diode (LED) to a planar light source.

3. The light guide plate of claim 1, wherein the light incident surface is formed as a slantly curved surface.

4. The light guide plate of claim 1, wherein a pattern lower surface of the engraved pattern, that is, a lower surface of the engraved pattern is aligned with a lower surface of the light guide plate, and a light incident surface angle with respect to the pattern lower surface of the engraved pattern is 25° to 85°.

5. The light guide plate of claim 1, wherein an apex angle of the engraved pattern is 70° to 125°.

6. The light guide plate of claim 1, wherein the engraved pattern has a depth of 4 μm to 12 μm.

7. The light guide plate of claim 1, wherein the light incident surface is formed as a slantly curved surface;

a pattern lower surface of the engraved pattern, that is, a lower surface of the engraved pattern is aligned with a lower surface of the light guide plate, and a light incident surface angle with respect to the pattern lower surface of the engraved pattern is 25° to 85°;

an apex angle of the engraved pattern is 70° to 125°;

the engraved pattern has a depth of 4 μm to 12 μm.

8. The light guide plate of claim 1, wherein the engraved pattern is a conical pattern formed by partially cutting a basic cone to have a slant surface at a side thereof.

9. The light guide plate of claim 8, wherein the conical pattern is formed by slantly cutting the basic cone such that a portion of the basic cone that is to be cut out includes an apex and a portion of a base of the basic cone, and the conical pattern is configured such that a curved surface thereof is positioned toward a light incident surface of the light guide plate member and the slant surface thereof is positioned in a direction opposite to the light incident surface of the light guide plate member.

10. The light guide plate of claim 8, wherein the conical pattern is positioned such that a density thereof gradually increases from a light incident surface of the light guide plate member at which the light source is positioned to a second side surface of the light guide plate member.

11. The light guide plate of claim 9, wherein the slant surface of the conical pattern is parallel to a side of the basic cone.

12. The light guide plate of claim 9, wherein the basic cone has a conical shape in which the apex is sharp, the base is circular, a side is curved, an internal apex angle is 95° to 125°, and a diameter of the base is 40 μm to 130 μm.

13. The light guide plate of claim 9, wherein a height difference between the conical pattern and the basic cone is 7 μm to 23 μm, and the engraved pattern has a depth of 4 μm to 12 μm.

14. The light guide plate of claim 9, wherein an apex portion of the conical pattern has an arc having a radius of curvature of 45 μm to 125 μm.

15. The light guide plate of claim 9, wherein an internal apex angle of the conical pattern is 70° to 115°.

16. The light guide plate of claim 9, wherein a light incident surface angle of the conical pattern is 25° to 60°.

17. The light guide plate of claim 16, wherein the conical pattern is configured such that a radius of curvature of a curved line of the base is 40 μm to 130 μm.

18. A backlight unit, comprising:

a light source emitting light;

a light guide plate member having a side surface at which the light source is positioned and allowing the light of the light source incident upon the side surface to be output to an upper surface thereof;

a diffusion sheet positioned on the light guide plate member and diffusing light; and a prism sheet positioned on the diffusion sheet and configured to refract and condense light, wherein the light guide plate member has multiple engraved patterns formed in a lower surface thereof and arranged to be spaced apart from each other, and each of the engraved patterns is configured such that an arc-shaped light incident surface thereof that is oriented toward the light source has a predetermined curvature on a plane and a vertical section thereof taken along a straight line passing through a center of the light incident surface is triangular, and wherein the light incident surface has an arc-shaped upper curved line positioned at an upper end thereof and having a predetermined curvature on a plane and an arc-shaped lower curved line positioned at a lower end thereof and having a predetermined curvature on a plane, the curvature of the lower curved line being smaller than that of the upper curved line, and the lower curved line has a radius of curvature of 30 μm to 150 μm.

19. A display device, comprising:

a light guide plate member having a side surface at which a light source is positioned and allowing light of the light source introduced from the side surface to be output to an upper surface thereof, wherein the light guide plate member has multiple engraved patterns formed in a lower surface thereof and arranged to be spaced apart from each other, and each of the engraved patterns is configured such that an arc-shaped light incident surface thereof that is oriented toward the light source has a predetermined curvature on a plane and a vertical section thereof taken along a straight line passing through a center of the light incident surface is triangular, and wherein the light incident surface has an arc-shaped upper curved line positioned at an upper end thereof and having a predetermined curvature on a plane and an arc-shaped lower curved line positioned at a lower end thereof and having a predetermined curvature on a plane, the curvature of the lower curved line being smaller than that of the upper curved line, and the lower curved line has a radius of curvature of 30 μm to 150 μm.

* * * * *